(12) United States Patent
Cermak et al.

(10) Patent No.: US 8,983,426 B2
(45) Date of Patent: Mar. 17, 2015

(54) PASSIVE INDIVIDUAL LOCATOR METHOD

(75) Inventors: Gregory Wayne Cermak, Needham, MA (US); Robert Anthony Virzi, Wayland, MA (US); Rebecca S. Burd, Groveland, MA (US); Edward M. Eggerl, Catonsville, MD (US); Gregory Keith Evans, Clarksville, MD (US); William E. Garrett, Framingham, MA (US); William D. Goodman, Collegeville, PA (US); Allison Dana Jaynes, New City, NY (US); Robert Edward Opaluch, Silver Beach, MA (US); Timothy Wayne Schmidt, Wilton, CT (US); James Francis Sorce, Needham, MA (US); Michael A. Weintraub, Medfield, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 980 days.

(21) Appl. No.: 11/273,296

(22) Filed: Nov. 14, 2005

(65) Prior Publication Data

US 2006/0105795 A1    May 18, 2006

Related U.S. Application Data

(60) Provisional application No. 60/629,172, filed on Nov. 18, 2004.

(51) Int. Cl.
*H04M 11/00* (2006.01)
*H04L 29/06* (2006.01)
(Continued)

(52) U.S. Cl.
CPC .............. *H04L 63/104* (2013.01); *H04W 4/24* (2013.01); *H04M 2215/32* (2013.01);
(Continued)

(58) Field of Classification Search
CPC ...... H04W 12/08; H04W 48/08; H04W 64/00; H04W 4/24; H04L 63/107; H04L 63/104; G06Q 10/10; H04M 2215/32; H04M 15/00
USPC ................... 455/518, 456.2, 513, 434, 456.1; 700/241, 242, 244; 342/457, 463, 450; 709/228; 340/573.1
See application file for complete search history.

(56) References Cited

U.S. PATENT DOCUMENTS 5,734,706 A * 3/1998 Windsor et al. .......... 379/142.01
6,509,830 B1   1/2003 Elliott
(Continued)

OTHER PUBLICATIONS

The Federal Aviation Administration, "Air Traffic Control System Command Center," downloaded on Mar. 18, 2005 from http://www.fly.faa.gov/flyfaa/nemap.jsp, pp. 1-2.
(Continued)

*Primary Examiner* — Mahendra Patel

(57) ABSTRACT

Groups of consenting users such as families can track where other members of the same group are under agreed upon access arrangements. The locating system can operate in a passive mode. Users do not have to actively sign-in or check-in to the locating system for the locating system to obtain individual location determination estimates. The locating system collects communications device usage information from a plurality of communications networks, e.g., landline, cellular, Wi-Fi, DSL. The locations of communication devices and infrastructure are known. Members of locating groups are associated with various communication devices detected are being used. Approximate locations of an individual member or members of a locating group are inferred from detected device usage information. A location report is generated, e.g., in a map, table, or audio format, indicating the determined location of individuals, and optionally including time tags. The report is provided to authorized members of the locating group.

11 Claims, 13 Drawing Sheets

(51) Int. Cl.
*G06Q 10/10* (2012.01)
*H04W 12/08* (2009.01)
*H04W 4/24* (2009.01)
*H04W 48/08* (2009.01)
*H04W 64/00* (2009.01)

(52) U.S. Cl.
CPC ............. *G06Q 10/10* (2013.01); *H04L 63/107* (2013.01); *H04W 12/08* (2013.01); *H04W 48/08* (2013.01); *H04W 64/00* (2013.01)
USPC ...... 455/405; 455/456.2; 709/228; 340/573.1

(56) References Cited

U.S. PATENT DOCUMENTS

| | | | | |
|---|---|---|---|---|
| 6,845,241 | B2* | 1/2005 | Edlund et al. | 455/456.1 |
| 7,002,477 | B1* | 2/2006 | Camhi | 340/573.1 |
| 7,373,428 | B1* | 5/2008 | Armstrong et al. | 709/249 |
| 2003/0096621 | A1* | 5/2003 | Jana et al. | 455/456 |
| 2003/0154293 | A1* | 8/2003 | Zmolek | 709/228 |
| 2004/0210442 | A1* | 10/2004 | Glynn et al. | 704/275 |
| 2006/0045245 | A1* | 3/2006 | Aaron et al. | 379/111 |
| 2006/0206246 | A1* | 9/2006 | Walker | 701/16 |

OTHER PUBLICATIONS uLocate "Partner with uLocate—the wireless LBS Autyhority!" downloaded on Mar. 18, 2005 from http://www.ulocate.com/index.html, (2004) p. 1.
uLocate "uLocate FamilyFinder," downloaded on Mar. 18, 2005 from http://www.ulocate.com/familyfinder.html, (2004) p. 1.
uLocate "uLocateFamilyFinder," downloaded on Mar. 18, 2005 from http://www.ulocate.com/how_it_works.html, (2004) pp. 1-2.
uLocate "uLocate FleetTracker," downloaded on Mar. 18, 2005 from http://www.ulocate.com/fleettracker.html, (2004) p. 1.
uLocate "Partner with uLocate—the wireless LBS Authority!" downloaded on Mar. 18, 2005 from http://www.ulocate.com/partner.html, (2004) p. 1.
uLocate "Partner with uLocate—the wireless LBS Authority!" downloaded on Mar. 18, 2005 from http://www.ulocate.com/technology.html, (2004) pp. 1-2.
uLocate "uLocate FamilyFinder," downloaded on Mar. 18, 2005 from http://www.ulocate.com/services.html, (2004) p. 1.
uLocate "Last Known Locations for All Units," downloaded on Mar. 18, 2005 from http://www.ulocate.com/main.jsp, (2004) p. 1.
uLocate "Last Known Message Report for All Units," downloaded on Mar. 18, 2005 from http://www.ulocate.com/main.jsp, (2004) p. 1.
uLocate "Today's Locations for Geoff," downloaded on Mar. 18, 2005 from http://www.ulocate.com/main.jsp, (2004) p. 1.
Wherify Wireless, downloaded on Mar. 18, 2005 from http://www.whereifywireless.com/products.htm, pp. 1-2.
Wherify Wireless "GPS Locator for Children," downloaded on Mar. 18, 2005 from http://www.whereifywireless.com/prodwatches.html, pp. 1-4.
Wherify Wireless "Wherefy's GPS Wherifone," downloaded on Mar. 18, 2005 from http://www.wherifywireless.com/univLoc.asp, pp. 1-2.
Wherify Wireless Screen Shot Examples, downloaded on Mar. 18, 2005 from http://www.wherify.com, 9 pgs.
TruePosition "TrueNorth Applications," downloaded on Mar. 18, 2005 from http://www.trueposition.com/TureNorthApplications.php, (2005) pp. 1-2.
TruePosition "Public Safety: E-911 and E-912," downloaded on Mar. 18, 2005 from http://www.trueposition.com/publicsafety.php, p. 1.
AT&T Wireless "find people nearby," downloaded on Mar. 18, 2005 from http://www.attwireless.com/personal/features/organization/findfriends.jhtml, (2004) p. 1.
RFID, Inc., downloaded from http://www.rfidinc.com/, pp. 1-3.
RFID, Inc., "Product Line Summaries," downloaded on Mar. 18, 2005 from http://www.rfidinc.com/products.html, pp. 1-2.
RFID, Inc., "RFID Frequencies Tutorial," downloaded on Mar. 18, 2005 from http://www.rfidinc.com/tutorial.html, pp. 1-3.
Ritter, Doug, "Personal Locator Beacons (PLBs) Approved in U.S.," downloaded on Mar. 18, 2005 from http://www.equipped.com/plb.legal.htm, (2002-2004) pp. 1-4.
"LoJack Car Security System for Stolen Vehicle Recovery," downloaded on Mar. 18, 2005 from http://www.lojack.com, (2005) p. 1.
AT&T Wireless "find people nearby," downloaded on Mar. 18, 2005 from http://www.attwireless.com/personal/features/organization/findfriendsqa.jhtml, p. 1.
OnStar "Plans & Services," downloaded on Mar. 18, 2005 from http://www.onstar.com/us_english/jsp/plans/index.jsp, (2004) pp. 1-2.
OnStar "Technology," downloaded on Mar. 18, 2005 from http://www.onstar.com/us_english/jsp/explore/onstar_basics/technology/jsp, (2004) pp. 1-3.
LoJack "What is LoJack?" downloaded on Mar. 18, 2005 from http://www.lojack.com/what/index.cfm, p. 1.
LoJack "What is LoJack?" downloaded on Mar. 18, 2005 from http://www.lojack.com/how-lojack-works/index.cfm, p. 1.
LoJack "Here's How LoJack Works," downloaded on Mar. 18, 2005 from http://www.lojack.com/what/see_how_lojack_works.cfm, p. 1.
Cell-Loc Location Technologies Inc. "Location Location Location," downloaded on Mar. 18, 2005 from http://www.cell-loc.com/what_locating.html, (Mar. 18, 2005) p. 1.
Cell-Loc Location Technologies Inc. "Fleet Tracking," downloaded on Mar. 18, 2005 from http://www.cell-loc.com/what_fleet.html, (Mar. 18, 2005) p. 1.
Cell-Loc Location Technologies Inc. "Asset Protection," downloaded on Mar. 18, 2005 from http://www.cell-loc.com/what_assets.html, (Mar. 18, 2005) p. 1.
Cell-Loc Location Technologies Inc. "Inventory Tracking," downloaded on Mar. 18, 2005 from http://www.cell-loc.com/what_inventory.html, (Mar. 18, 2005) p. 1.

* cited by examiner

PASSIVE INDIVIDUAL LOCATOR METHOD

RELATED APPLICATIONS

This application claims the benefit of U.S. Provisional Patent Application Ser. No. 60/629,172, filed on Nov. 18, 2004, titled: "PASSIVE LOCATOR".

TECHNICAL FIELD

Systems and methods implemented according to the present invention may be employed for locating individuals, and more particularly for passively locating individuals using communications infrastructure.

BACKGROUND

It is desirable for people in social groups and business groups to know where other members of the same group are located on a frequent basis. Even if not possible to know the exact location of each group member every minute of the day, it still can be very beneficial to have knowledge of group member location on a less frequent but fairly often basis, e.g., obtaining a location estimation or approximation on an individual to within an hour or to within a couple of hours or at an approximate location (e.g., "at work"). Consider a social group comprising an extended family. For example, parents need to know where their children are after school in order to plan errands, pick them up to transport them home or to various activities, or to know that they are not associating with the wrong types of elements, e.g., hanging out at the pool hall with the motorcycle gang. Similarly, children sometimes need to know where their parents are located. For example, a child may need to know whether each parent is at home, at the office, in transit, at the grocery store purchasing food for dinner, or across town on an errand so that the child can make arrangements to find a parent or another adult for transportation, etc. Further, spouses may want to know when the other spouse is on the golf course, at work, etc. In addition, a family member may want to know when another family member is on an errand, e.g., to the post office, dry cleaners, shopping mall, etc. It is also desirable to be able to keep track of extended family members, such as elderly relatives who may not often leave the home or who may have trouble finding their way around.

However, most people find it burdensome to be continually making telephone calls to let others know where they are. Furthermore, many people with mobile telephones lose them, forget them, or forget to turn them on. This is especially true with children. In addition mobile phone coverage is not seamless, and mobile phones are prohibited or not practical at some locations or during some activities. Some older people do not have, do not know how to use and/or do not desire to use mobile telephones and/or answering machines.

Presently, the Global Positioning System (GPS) can be used to track and locate people and vehicles. However, GPS is expensive, intrusive, and typically requires some effort and cooperation by the person sought to be located. GPS location determination is also dependent upon the GPS receiver's antenna being able to receive signals from a plurality of satellites, e.g., via a line of sight to each satellite, thus making GPS tracking not practical for indoor locating of individuals. For these reasons, GPS generally is not very practical, efficient, or cost-effective for locating individuals, particularly children and the elderly and infirm.

Accordingly, it would be desirable for people in social groups such as families to have an easy, inexpensive, non-intrusive and/or cost-effective way to keep track of each other. People formed into groups for other reasons, e.g., based upon business, civic, volunteer services, clubs, school, or other various associations, could also benefit from such locating methods and apparatus. Methods and apparatus that make use of existing infrastructure and accounting information collected on individuals and/or devices would be beneficial. Methods and apparatus that perform location determinations on members of a group in a passive manner would also be beneficial. It would also be advantageous if such passive capable locating systems also included features allowing members of a group to actively enter location information, e.g., to enhance location determination. It would also be useful if location determinations of one or more members of a group were available for viewing in a user friendly format, e.g., a map format, or some other format, e.g., a format including an audio presentation of the location information.

DETAILED DESCRIPTION OF PREFERRED EMBODIMENTS

Figure 1:
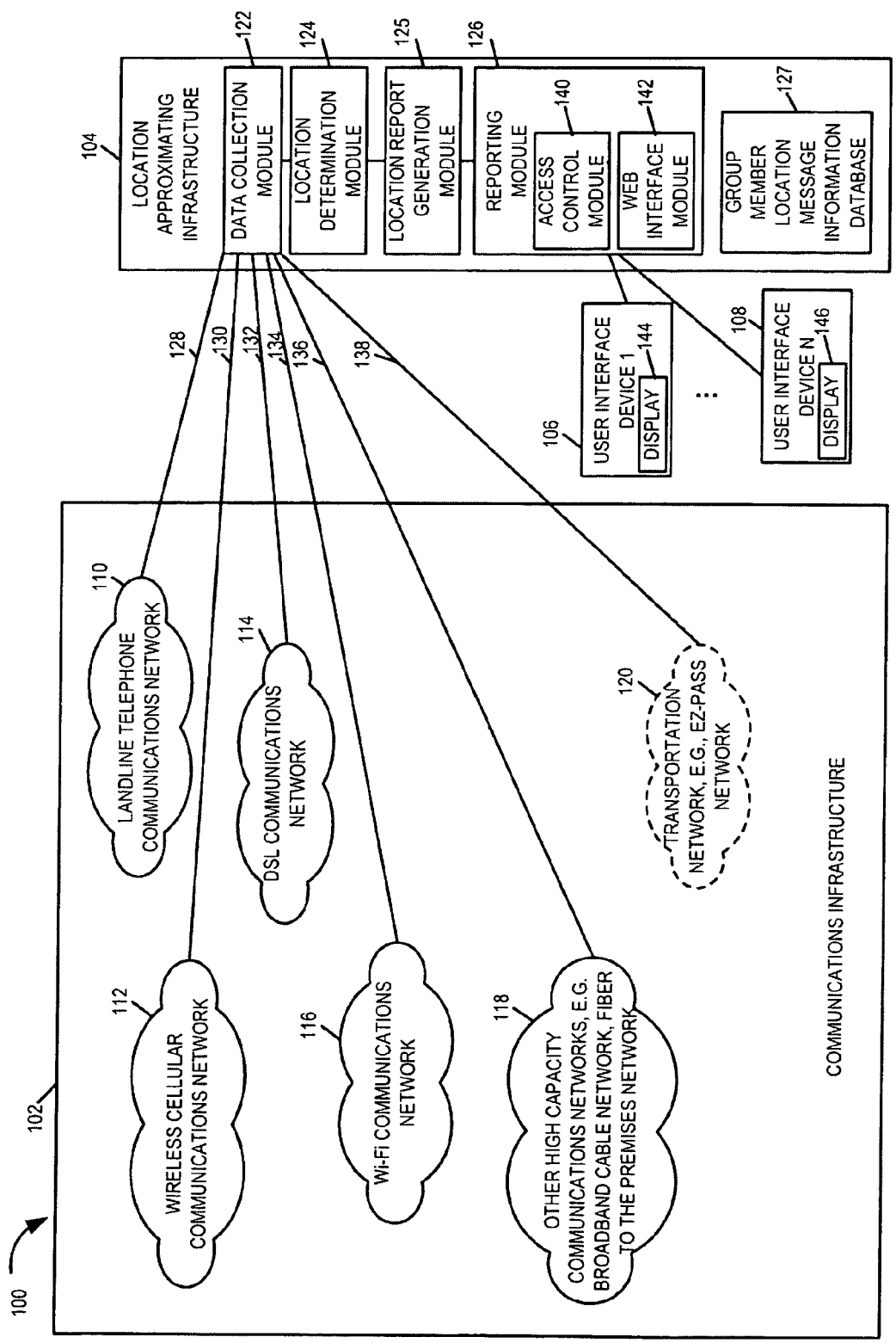
FIG. 1 is a drawing of an exemplary individual locating system implemented in accordance with the present invention and using methods of the present invention.

FIG. 1 is a drawing of an exemplary individual locating system 100 implemented in accordance with the present invention and using methods of the present invention. Exemplary individual locating system 100 uses communications infrastructure activity information and inferential logic to passively locate individuals. Members of designated groups of individuals can access the inferred location information pertaining to the individuals of the group, under agreed upon security and privacy arrangements. Exemplary locating system 100 includes communications infrastructure 102, location approximating infrastructure 104, and a plurality of user interface devices (user interface device 1 106, user interface device N 108). Exemplary communications infrastructure 102 includes a landline telephone communications network 110, a wireless cellular communications network 112, a digital subscriber line (DSL) communications network 114, a Wi-Fi communications network 116, other high capacity communications networks 118, e.g., a broadband cable communications network and/or a fiber to the premises communications network, and, in some embodiments, a transportation network 120, e.g., an EZ-Pass network. The communications infrastructure 102 could include an IP network that could be used to provide a TV service in addition to voice and/or other services. In such a case, video channel change traffic initiated by a user of the video system and the resulting video service signals going to and from a subscriber's site can be tracked and used to provide location information.

In some embodiments each of the networks are operated by the same entity controlling the location approximating infrastructure 104. In other embodiments some of the networks are operated by the same entity, e.g., a controlling entity, while some of the networks are operated by partner entities working in cooperation under contractual agreements with the controlling entity. For example, landline telephone communications network 110, the wireless cellular communications network 112, the DSL communications network 114, the WI-FI communications network 116, and the location approximating infrastructure 104 may be operated by the same communications service provider, while a broadband cable network 118 may be operated by a partner entity, e.g., a cable television service provider, and transportation network 120 may be operated by another partner entity, e.g., a government contracted toll collection network management firm. In addition, in some embodiments, portions of a network, e.g., portion of wireless cellular communications network 112, may be operated by different service providers working under partnership agreements.

A service provider offering passive location approximation based on monitoring of communications infrastructure activity can typically provide more accurate location estimates as users subscribe to more different types of services offered by the same single carrier. Thus, users have an incentive to purchase bundled package plans from a single carrier offering this passive locating service. In addition, groups of individuals, e.g., extended families, have an incentive to subscribe to the same communications service provider offering the passive location service, so that they may form a designated locating group.

Location approximation infrastructure 104 includes a data collection module 122, a location determination module 124, a location report generation module 125, a reporting module 126, and a group member location message information database 127. Exemplary data collection module 122 is coupled to networks (110, 112, 114, 116, 118, 120) via network infrastructure (128, 130, 132, 134, 136, 138), respectively. For example, network infrastructure (128, 130, 132, 134, 136, 138) may include hardware and/or software including portions of the Internet such as, e.g., multiplexing devices, routers, servers, relay stations, wire and fiber optic cables. In some embodiments, the location approximating infrastructure 104 is part of one of the communication network's infrastructure, e.g., part of the landline telephone communications network 110. Data collection module 122 requests, receives, and accumulates activity information associated with members of location monitoring groups from networks (110, 112, 114, 116, 118, 120). Location determination module 124, which is coupled to data collection module 122, uses the information obtained by data collection module 122, user profile information, and network infrastructure information to infer the location of members of location monitoring groups. Location report generation module 125, which is coupled to location determination module 124, generates reports on the determined location of individuals and/or groups of individuals, e.g., maps identifying estimated approximate determined locations of individuals within a pre-defined group. Reporting module 126, which is coupled to location report generation module 125, includes an access control module 140 and a Web interface module 142. The access control module 140 restricts access of location reports to members of a designated locating group who are authorized to access the location information. The Web interface module 142 provides a user interface via the Internet, to the location approximating infrastructure 104 allowing users subscribing to the locating service to: update user profile information, store location information messages in a shared store in group member location information database 127, retrieve location information messages from the shared store, request and receive generated reports of member estimated location information in a plurality of formats including graphical mapping including time-tag designations.

User interfaces devices (device 1 106, device N 108), e.g., personal computers, laptop personal computers (PCs), personal data assistants (PDAs), etc., include hardware and/or software supporting Internet access and can be coupled to the reporting module 126 of location approximating infrastructure 104, e.g., via a service provider Web site associated with the Web interface module 142 which supports the location approximation interface functionality. User interface devices (106, 108), include displays (144, 146), respectively, which can be used to display location reports including a map indicating the location of group members. User interface devices (106, 108) are typically end user devices included as part of or coupled through one of the communications networks (110, 112, 114, 116, 118). In other embodiments, user interface devices (106, 108) may include devices including hardware and/or software supporting voice and/or Dual Tone Multi-Frequency (DTMF) interfaces providing access to the reporting module 126 of the location approximating infrastructure 104, e.g., via automated speech and/or tone recognition activated menus.

In some embodiment the location report is implemented in the form of a map. However, in other embodiments, the location report is implemented as a simple table with, e.g., one row for each person tracked indicating such information as who the tracked person is, the name of a location at which the person is located, e.g., work, and an indication of a time stamp associated with the location information or some other indicator of the location information's timeliness and/or reliability. In some other embodiments, the location report may be presented in an oral form. For example, in some implementations interface module 142 supports telephone access and includes speech generation capabilities which can be used to provide a location report to a party calling in seeking the location information. In one such embodiment, a subscriber can call in and, upon providing proof of the subscriber's identity, e.g., by providing a PIN which can be checked against a previously stored subscriber PIN, will be supplied with the location report by an automated voice system which can read off the information present in the previously described table version of a location report. In this manner, a caller can receive approximate location information about one or more members of a group without the need for a display device or Internet access device. Numerous combinations of location report presentation techniques can be supported in the system with some users choosing to use Internet based access and maps to receive location information, other subscribers may use the telephone based techniques while still others may use a combination of the techniques to receive the reports depending on their particular circumstances and ability to access a phone or the Internet at a particular point in time.

Figure 2:
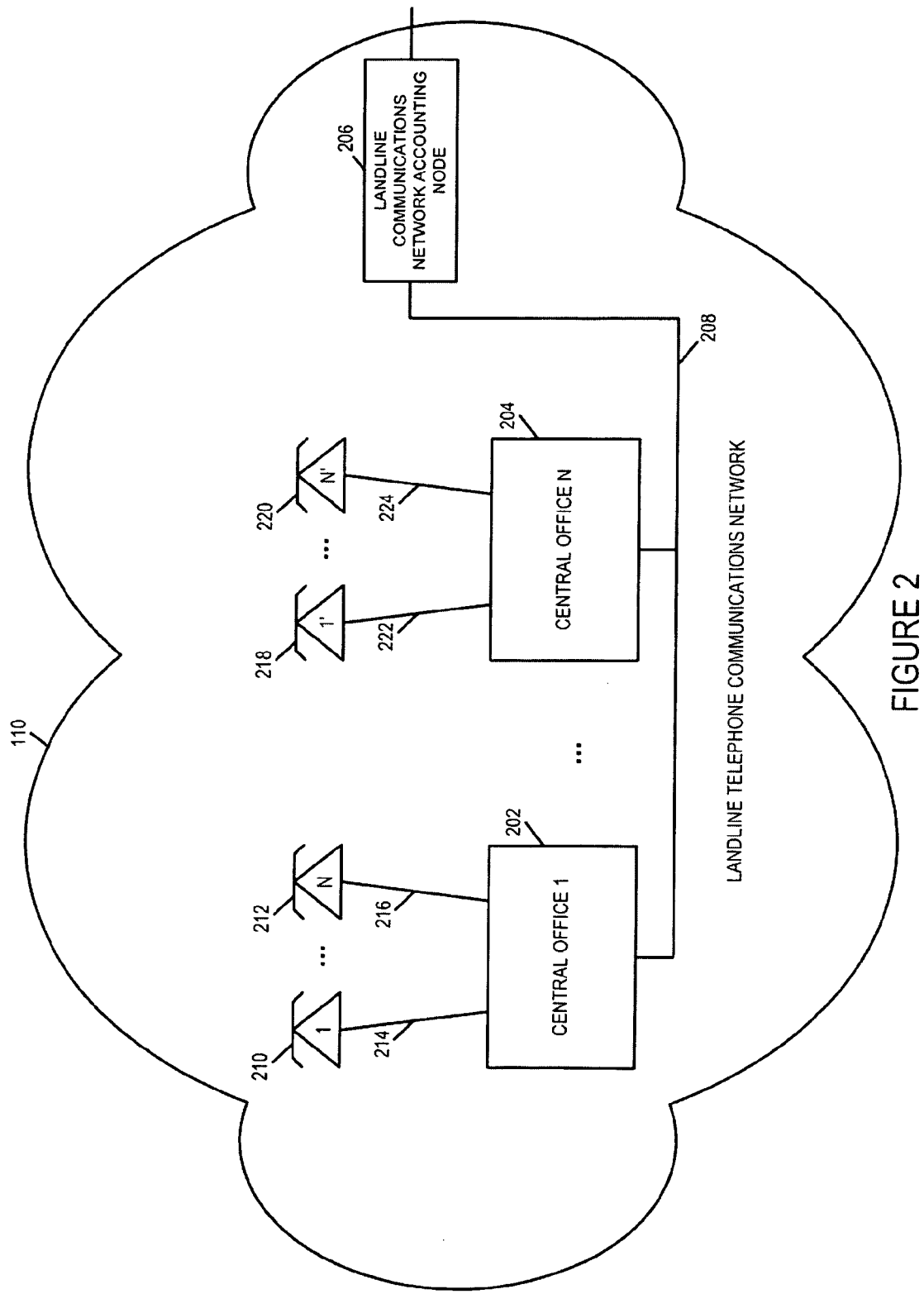
FIG. 2 is a drawing of an exemplary landline telephone communications network implemented in accordance with the present invention and using methods of the present invention.

FIG. 2 is a drawing of an exemplary landline telephone communications network 110 implemented in accordance with the present invention and using methods of the present invention. Exemplary landline telephone communications network 110 includes a plurality of central offices (central office 1 202, central office N 204) and a landline communications accounting node 206 coupled together via infrastructure 208, e.g., routers, wire links, fiber optics links, etc. Central Offices (202, 204) use a Public Switched Telephone Network (PSTN) signaling protocol, e.g., Signaling System 7 (SS7) Protocol. Central office 1 202 is coupled to a plurality of telephone line user devices (device 1 210, device N 212), e.g., landline telephones, fax machines, answering machines, via links (214, 216), respectively. Similarly, central office N 204 is coupled to a plurality of telephone line user devices (device 1' 218, device N' 220) via links (222, 224), respectively. Each link (214, 216, 222, 224) may be, e.g., a standard twisted pair copper wire set representing a plain old telephone service (POTS) line. A different telephone number may be associated with each line (214, 216, 222, 224) and the location of the termination point of the line, e.g., the location of device (210, 212, 218, 220) is known to the service provider operating network 110 and has been stored, e.g., in the landline communications accounting node 206. Activity, e.g., outgoing call activity information relevant to locating individuals, can be recorded in accounting node 206. Devices (210, 212, 218, 220) may include devices located at both private, e.g., home, office, and/or public sites.

Specific phone lines may be designated as being associated with a specific individual or group of individuals within a locating group of individuals. For example, a private home may include two landline lines. A first line being designated a communal family phone and corresponding to a phone or phones in common areas of the home, e.g., kitchen, hallway, living room, etc. A second line may be associated with a single individual, e.g., a daughter, and the corresponding phone may be located in her room.

Similarly, in an office environment landline phone lines may be associated with an individual or group of individuals. In some embodiments, features, services, and/or functions included and available in the landline communications network by the service provider, e.g., caller-ID, voice recognition, calling cards, answering machine services, may be used in the location approximation determination. For example, if a member of a locating group calls the service provider answering service to check his/her messages, e.g., from a public phone, the location of the public phone from which the call was initiated can be determined via caller-ID tracing and such information communicated to the landline communications network accounting node 206. As another example, consider that a member of a locating group places a call, e.g., from a public phone, using his/her calling card; the calling card number can be used to identify the individual and the caller-ID tracing can be used to obtain the location of the initiating public phone site and such information communicated to accounting node 206. In another example, when a designated landline phone that may be used by a member of a locating group, e.g., an office phone subject to use by multiple individuals, is used to place an outgoing call, voice recognition may be used to positively identify the individual placing the call, and such information can be communicated to the accounting node 206.

The landline communications accounting node 206, tracks incoming and outgoing call activity for each of the lines (214, 216, 222, 224); relevant tracked information pertaining to group member locations may be forwarded to the data collection module 122 of the location approximating infrastructure 104.

Figure 3:
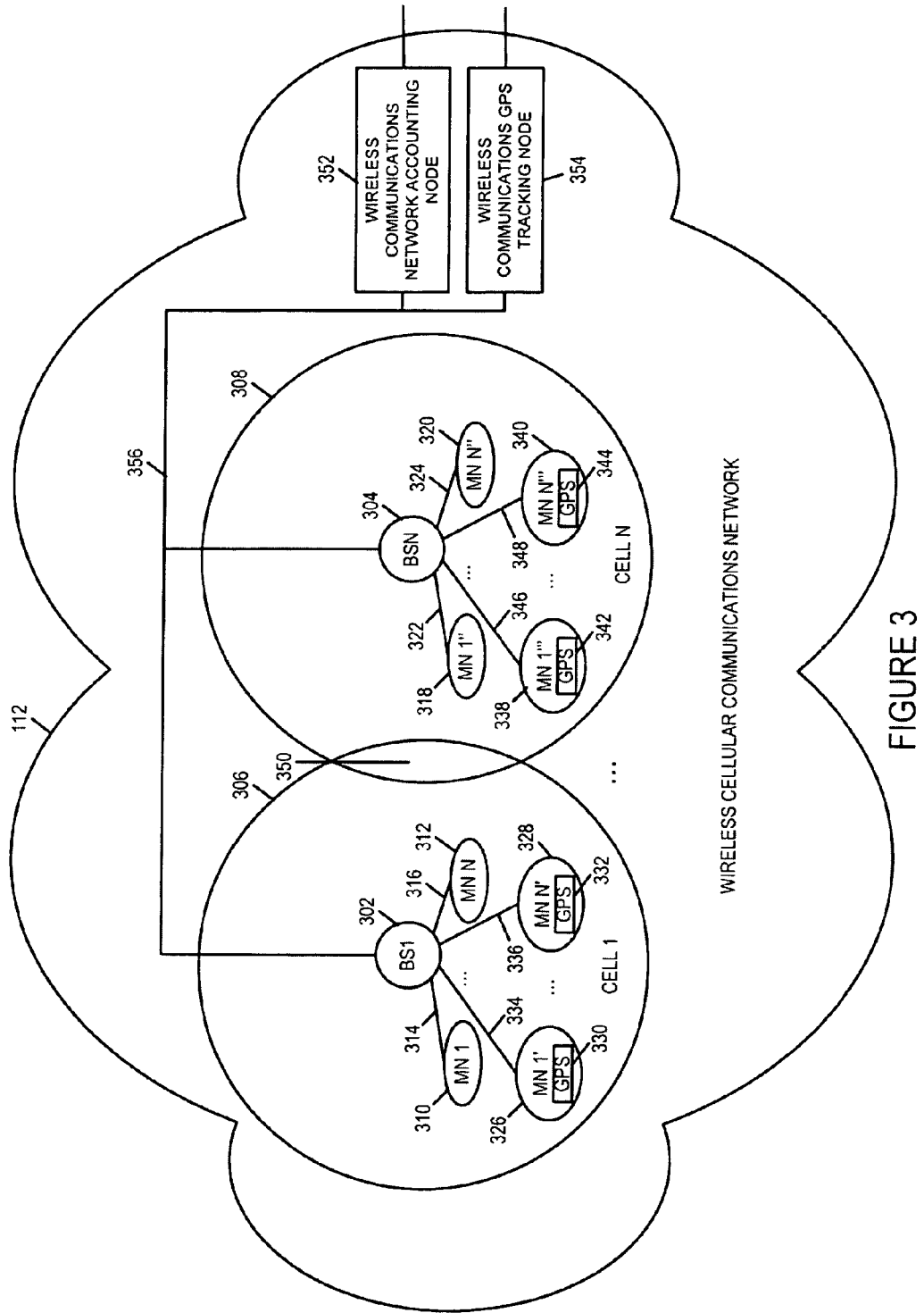
FIG. 3 is a drawing of an exemplary wireless cellular communications network implemented in accordance with the present invention and using methods of the present invention.

FIG. 3 is a drawing of an exemplary wireless cellular communications network 112 implemented in accordance with the present invention and using methods of the present invention. Exemplary wireless cellular communications network 112 includes a plurality of base stations (BS 1 302, BS N 304), each base station (302, 304) having a wireless coverage area (cell 1 306, cell N 308), respectively. Mobile Nodes (MNs) within a BS's cellular coverage area may use the cell's BS as their point of network attachment. A plurality of MNs (MN 1 310, MN N 312) are coupled to BS 1 302 via wireless links (314, 316), respectively. Similarly, a plurality of MNs (MN 1" 318, MN N" 320) are coupled to BS N 304 via wireless links (322, 324), respectively. MNs (310, 312, 318, 320) may be cellular communications devices, e.g., cellular phones supporting voice, text, and/or video imaging via wireless communications. Other cellular communications devices may include instant messaging devices and/or paging devices. Cell 1 306 also includes a plurality of MNs (MN 1' 326, MN N' 328) each including a GPS module (330, 332), respectively; each MN (326, 328) is coupled to BS 1 302 via wireless links (334, 336), respectively. Similarly, cell N 308 includes a plurality of MNs (MN 1''' 338, MN N''' 340) each including a GPS module (342, 344), respectively; each MN (338, 340) is coupled to BS N 304 via wireless links (346, 348), respectively. MNs (326, 328, 338, 340) include cellular communications devices, e.g., cell phones enhanced with a GPS receiver, cellular communication devices with an input to receive and forward information from a GPS receiver, and GPS location and/or tracking devices with wireless communications means to communicate the determined GPS position information. MNs (310, 312, 318, 320, 326, 328, 338, 340) may use typical cellular communications protocols and standards over the wireless links, e.g., code division multiple access (CDMA) and/or Group Speciale Mobile (GSM) protocols and standards. MNs (310, 312, 318, 320, 326, 328, 338, 340) may each be associated with a cell phone number, individual, and/or personal identification number (PIN). MNs (310, 312, 318, 320, 326, 328, 338, 340) may move throughout the cellular communications network 112 and attach to different BSs (302, 304). Each BS (302, 304) is associated with a corresponding cell antenna tower, the location of each BS (302, 304) cell tower and the corresponding area of each cell (306, 308) is known and stored, e.g., in wireless communications network accounting node 352 and/or wireless communications GPS tracking node 354.

In some embodiments, wireless signals sent by a MN, e.g., MN 1 310, to its current attachment point, e.g., BS 1 302, may also be detected and measured by adjacent BSs, e.g., BS N 304. Received signals from a MN detected by multiple BSs and compared, e.g., in terms of signal strength and/or timing differences may be used to triangulate the position of the MN within the cell corresponding to the BS that the MN is using as its network attachment point, e.g., within cell 1 306. Other approaches may be used to obtain the MNs approximate position within a cell. For example, the point and time at which a MN switches from using one BS as its point of attachment to another adjacent BS as it point of network attachment may be recorded, such information corresponding to the vicinity of a boundary area, e.g., boundary area 350. In addition, changes in received signal strength over time detected at the BS attachment point may be used to identify whether the MN is proceeding toward or away from the BS.

Although shown in the exemplary embodiment with one sector per cell, it is to be understood that the methods and apparatus of the present invention can be extended to multi-sector embodiments, e.g., embodiments including two, three, or more than three sectors per cell. In such multi-sector embodiments, sector boundary crossing information can also be used in location determination.

In some embodiments, the On/Off status of a mobile device corresponding to a location group member's cellular communications device, e.g., MN 1 310 may also be monitored, stored, and such information utilized in the individual location determination. For example, family members may be aware that an individual turns off his/her cell phone during certain activities and/or at certain locations, e.g., when indoors at home, mealtime at certain restaurants where cell phones are prohibited, during sporting or exercise activities, etc.

The BSs (302, 304), wireless communications network accounting node 352, wireless communications GPS tracking node 354 are coupled together via a backhaul network 356, e.g., including routers, home agent nodes, wire links and fiber optic links. The backhaul network may use a packet switching protocol or protocols, e.g., Internet Protocol version 4 (IPv4) or IPv6.

Wireless communications network accounting node 352 stores information including: point of attachment being used by each MN and associated time information, boundary crossing information and information that may be used for MN triangulation. Wireless communications GPS tracking node 354 stores received, determined and/or estimated GPS position and/or velocity information corresponding to signals received from MNs (326, 328, 338, 340). Information received and/or stored by accounting node 352 and GPS tracking node 354 may be forwarded to the data collection module 122 of the location approximating infrastructure 104.

Figure 4:
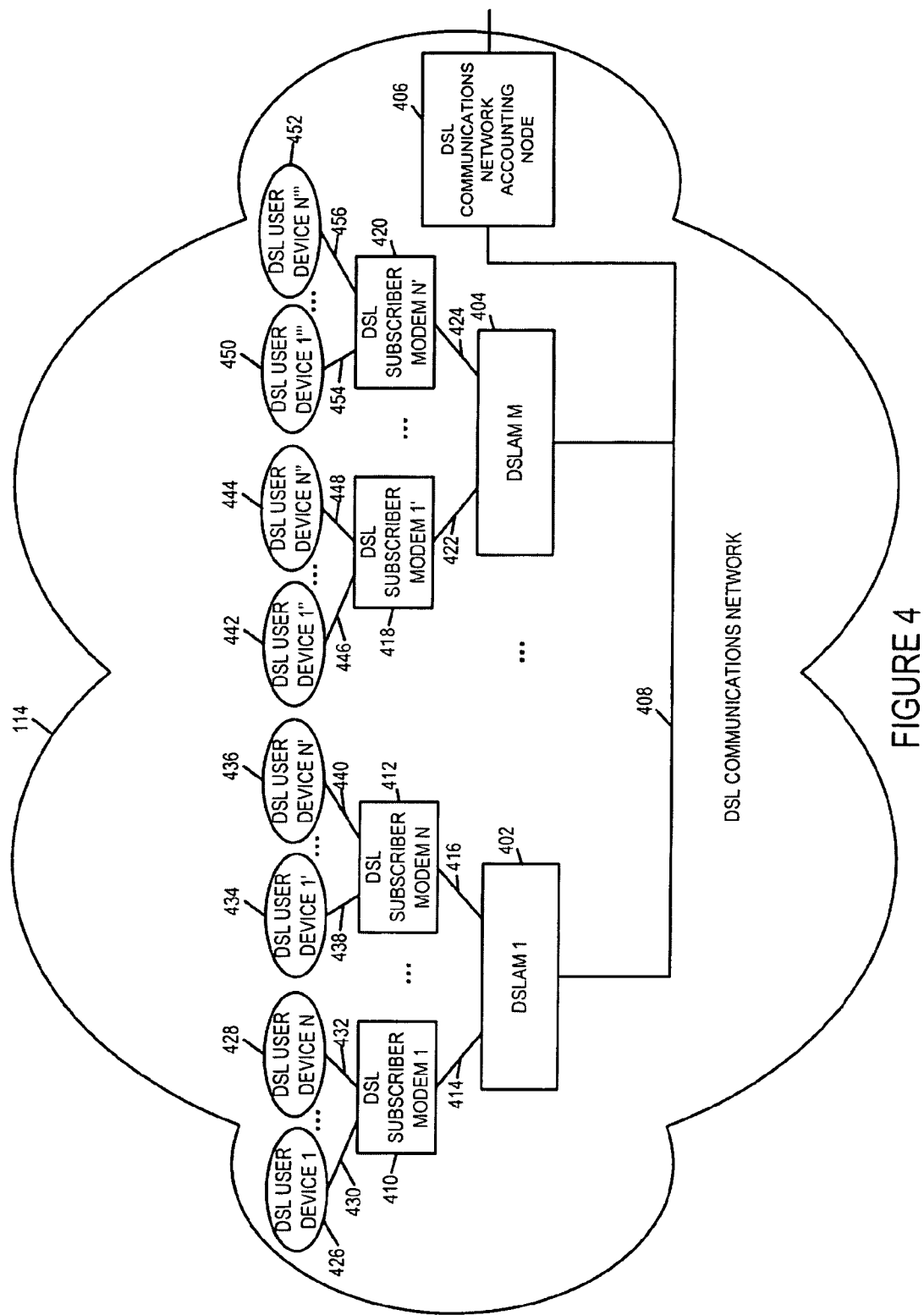
FIG. 4 is a drawing of an exemplary DSL communications network implemented in accordance with the present invention and using methods of the present invention.

FIG. 4 is a drawing of an exemplary DSL communications network 114 implemented in accordance with the present invention and using methods of the present invention. Exemplary DSL communications network 114 includes a plurality of Digital Subscriber Line Access Multiplexers (DSLAMs) (DSLAM 1 402, DSLAM M 404) and a DSL communications accounting node 406 coupled together via infrastructure 408, e.g., routers, wire links, fiber optics links, etc. DSLAMs (402, 404) may be located in a Central Office(s). DSLAMs (402, 404) use typical digital subscriber line standards and protocols, e.g., Asymmetric Digital Subscriber Line (ADSL) or Rate Adaptive Digital Subscriber Line (RADSL) standards and protocols. DSLAM 1 402 is coupled to a plurality of DSL subscriber modems, e.g. ADSL Transmission Units—Remote (ATUs-R), (DSL subscriber modem 1 410, DSL subscriber modem N 412), via links (414, 416), respectively. Similarly, DSLAM M 404 is coupled to a plurality of DSL subscriber modems (DSL subscriber modem 1' 418, DSL subscriber modem N' 420) via links (422, 424), respectively. The location of each DSL subscriber modem (410, 412, 418, 420) corresponds to a home or business site, and the location information associated with each modem (410, 412, 418, 420) is known and stored, e.g., in DSL communications network accounting node 406. DSL subscriber modem 1 410 is coupled to a plurality of DSL user devices (DSL user device 1 426, DSL user device N 428 via links (430, 432), respectively. DSL subscriber modem N 412 is coupled to a plurality of DSL user devices (DSL user device 1' 434, DSL user device N' 436 via links (438, 440), respectively. DSL subscriber modem 1' 418 is coupled to a plurality of DSL user devices (DSL user device 1'' 442, DSL user device N'' 444 via links (446, 448), respectively. DSL subscriber modem N' 420 is coupled to a plurality of DSL user devices (DSL user device 1''' 450, DSL user device N''' 452 via links (454, 456), respectively. Links (414, 416, 422, 424, 430, 432, 438, 440, 446, 448, 454, 456) may be, e.g., wire or fiber optic links, and capacity levels may vary, e.g., link 414 typically has higher capacity than link 430. DSL user device (426, 428, 434, 436, 442, 444, 450, 452) may be, e.g., personal computers with Internet access, Voice over Internet Protocol (VoIP) phones, inter-active video display devices, e.g., for television programming services and/or movies on demand. Each device (426, 428, 434, 436, 442, 444, 450, 452) may be associated with a more specific location at a site corresponding to a DSL modem and/or a specific individual or group of individuals, who are a member or members of a locating group. Hardware addresses, usernames, log-in passwords, etc., may be also be used to determine the specific member of the locating group who is communicating through a DSL user device, e.g., device 426. Tracking information including indications of outgoing signaling activity from DSL user devices (426, 428, 434, 436, 442, 444, 450, 452) and time-tag session information corresponding to member(s) of locating groups may be recoded in accounting node 406. Information received and/or stored by accounting node 406 may be forwarded to the data collection module 122 of the location approximation infrastructure 104.

Figure 5:
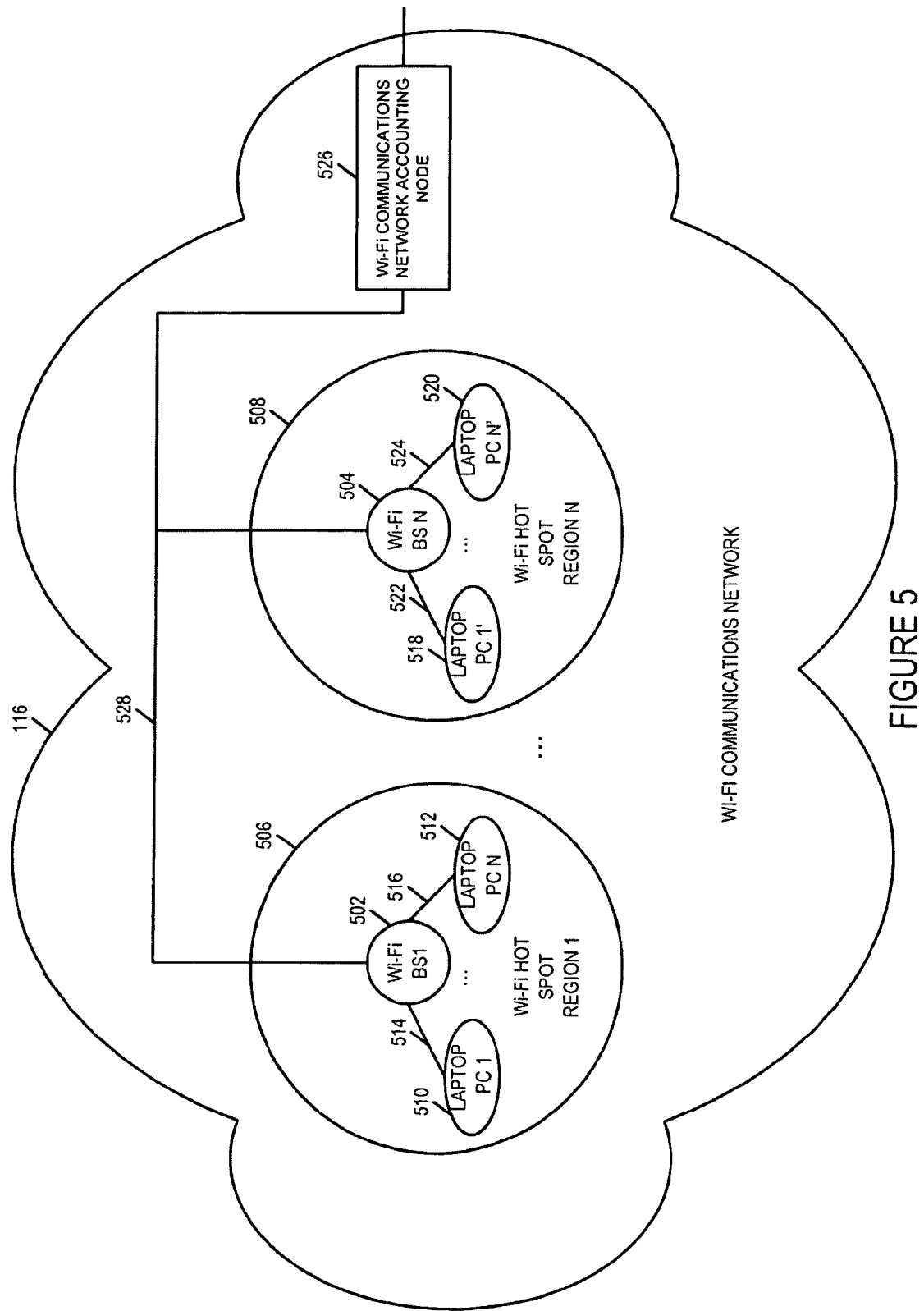
FIG. 5 is a drawing of an exemplary Wi-Fi communications network implemented in accordance with the present invention and using methods of the present invention.

FIG. 5 is a drawing of an exemplary Wi-Fi communications network 116 implemented in accordance with the present invention and using methods of the present invention. Exemplary Wi-Fi communications network 116 includes a plurality of Wi-Fi base stations (Wi-Fi BS 1 502, Wi-Fi BS N 504), each base station (502, 504) having a wireless coverage area, sometimes referred to as a Wi-Fi hot spot, (Wi-Fi hot spot region 1 506, Wi-Fi hot spot region N 508), respectively. Laptop PCs or other wireless communications devices, e.g., Personal Digital Assistants (PDAs), including a Wi-Fi interface within a Wi-Fi local coverage area, a Wi-Fi hot spot, may use the corresponding Wi-Fi BS as their point of network attachment. A plurality of laptop PCs (laptop PC 1 510, laptop PC N 512) are coupled to Wi-Fi BS 1 502 via wireless links (514, 516), respectively. Similarly, a plurality of laptop PCs (laptop PC 1' 518, laptop PC N' 520) are coupled to Wi-Fi BS N 504 via wireless links (522, 524), respectively. The air link interface and air link communications in the Wi-Fi network 116 may use typical Wi-Fi protocols and standards, e.g., an 802.11 protocol and standard such as 802.11b and/or 802.11g. Laptop PCs (510, 512, 518, 520) may each be associated with an individual, user login name, password, and/or personal identification number (PIN). Laptop PCs (510, 512, 518, 520) may move throughout the Wi-Fi communications network 116 and attach to different Wi-Fi BSs (502, 504). The location of each BS (502, 504) and the corresponding area of each Wi-Fi hot spot coverage region (506, 508) is known and stored, e.g., in Wi-Fi communications network accounting node 526.

The Wi-Fi BSs (502, 504) and a Wi-Fi communications network accounting node 526 are coupled together via a backhaul network 528, e.g., including routers, home agent nodes, wire links and/or fiber optic links. Wi-Fi communications network accounting node 526 stores information including: point of attachment being used by each laptop PC and associated time information, e.g. log-on time, log-off time. Information received and/or stored by accounting node 526 may be forwarded to the data collection module 122 of the location approximating infrastructure 104.

Figure 6:
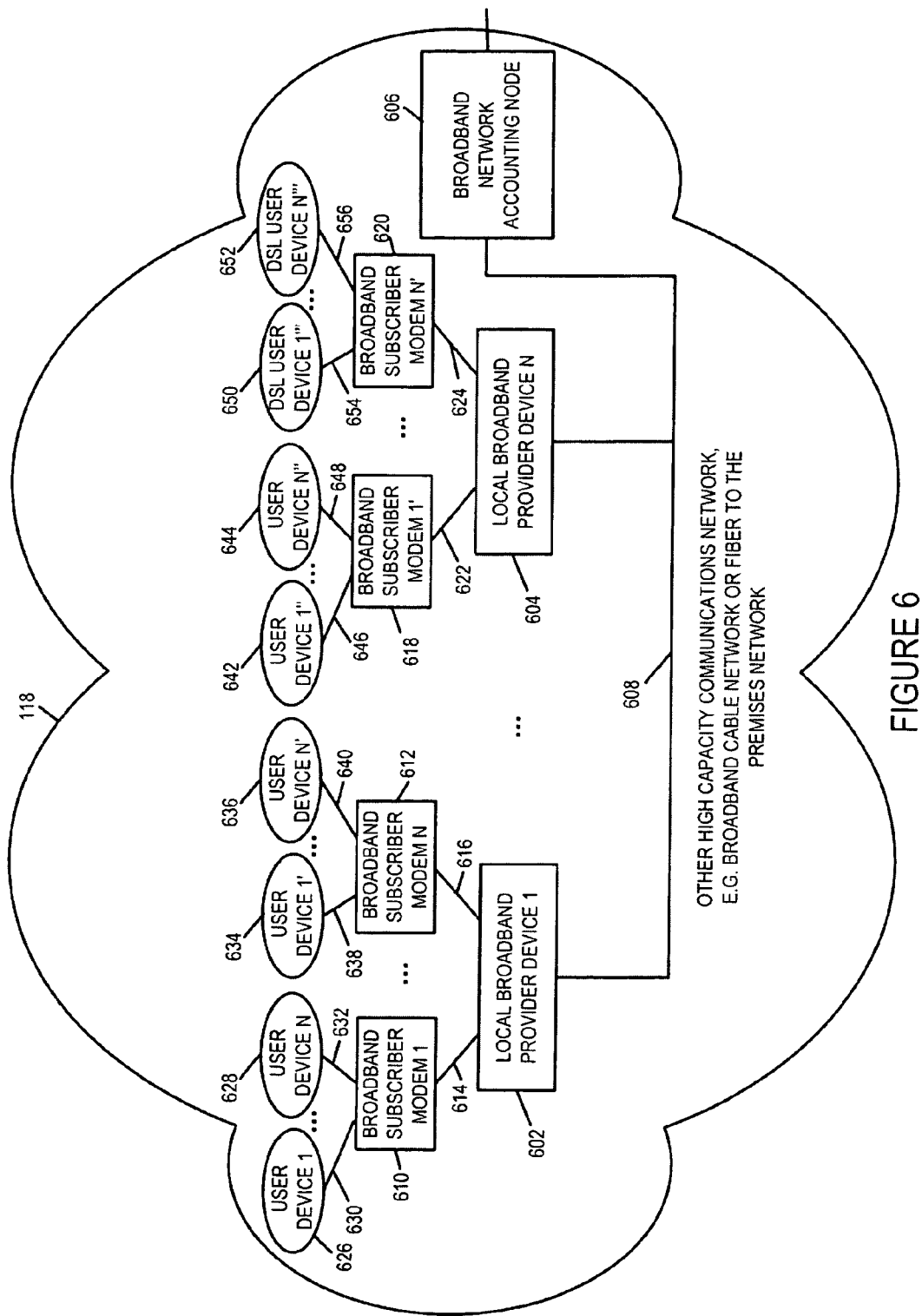
FIG. 6 is a drawing of an exemplary other high capacity communications network, e.g., a broadband cable network or a fiber to the premises network, implemented in accordance with the present invention and using methods of the present invention.

FIG. 6 is a drawing of an exemplary other high capacity communications network 118, e.g., a broadband cable network or a fiber to the premises network, implemented in accordance with the present invention and using methods of the present invention. Exemplary broadband communications network 118 includes a plurality of local broadband provider devices (local broadband provider device 1 602, local broadband provider device N 604) and a broadband communications accounting node 606 coupled together via infrastructure 608, e.g., routers, wire links, fiber optics links, etc. Devices (602, 604) may be located in a Central Office(s). Device 1 602 is coupled to a plurality of broadband subscriber modems, e.g. cable modems (broadband subscriber modem 1 610, broadband subscriber modem N 612), via links (614, 616), respectively. Similarly, Device N 604 is coupled to a plurality of broadband subscriber modems (broadband subscriber modem 1' 618, broadband subscriber modem N' 620) via links (622, 624), respectively. The location of each broadband subscriber modem (610, 612, 618, 620) corresponds to a home or business site, and the location information associated with each modem (610, 612, 618, 620) is known and stored, e.g., in broadband communications network accounting node 606. Broadband subscriber modem 1 610 is coupled to a plurality of broadband user devices (user device 1 626, user device N 628) via links (630, 632), respectively. Broadband subscriber modem N 612 is coupled to a plurality of broadband user devices (user device 1' 634, user device N' 636) via links (638, 640), respectively. Broadband subscriber modem 1' 618 is coupled to a plurality of broadband user devices (user device 1" 642, user device N" 644) via links (646, 648), respectively. Broadband subscriber modem N' 620 is coupled to a plurality of broadband user devices (user device 1''' 650, user device N''' 652) via links (654, 656), respectively. Broadband user device (626, 628, 634, 636, 642, 644, 650, 652) may be, e.g., personal computers with Internet access, VoIP phones, inter-active video display devices, e.g., for television programming services and/or movies on demand. Each user device (626, 628, 634, 636, 642, 644, 650, 652) may be associated with a more specific location at a site corresponding to a broadband modem and/or a specific individual or group of individuals, who are a member or members of a locating group. Hardware addresses, usernames, log-in passwords, etc., may be also be used to determine the specific member of the locating group who is communicating through a user device, e.g., device 626. Tracking information including indications of outgoing signaling activity from broadband user devices (626, 628, 634, 636, 642, 644, 650, 652) and time-tag session information corresponding to member(s) of location tracking groups may be recoded in accounting node 606. Information received and/or stored by accounting node 606 may be forwarded to the data collection module 122 of the location approximation infrastructure 104.

Figure 7:
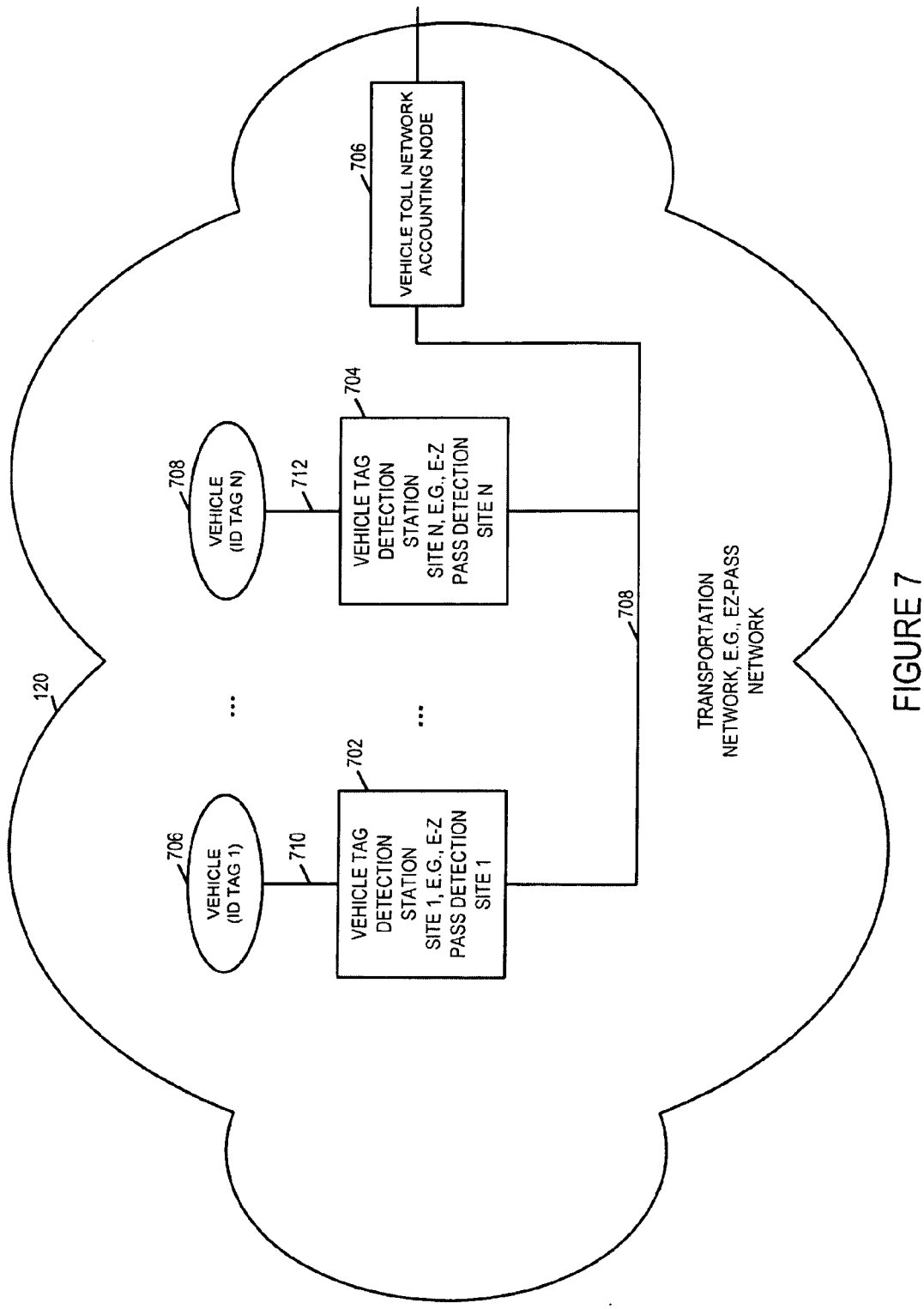
FIG. 7 is a drawing of an exemplary transportation network, e.g., an EZ-Pass toll collection network, implemented in accordance with the present invention and using methods of the present invention.

FIG. 7 is a drawing of an exemplary transportation network, e.g., an EZ-Pass toll collection network 120, implemented in accordance with the present invention and using methods of the present invention. Exemplary toll collection network 120 includes a plurality of vehicle tag, e.g., EZ pass tag, detection station sites, (detection site 1 702, detection site N 704) and a vehicle toll network accounting node 706 coupled together via infrastructure 708, e.g., routers, wire links, fiber optic links, etc. The vehicle toll network accounting node 706 may be located at a central location, e.g., a billing processing center. Each vehicle tag detection site (702, 704) corresponds to a specific location of a toll collection point, e.g., a toll booth on a road such as a parkway or turnpike, a toll booth at a bridge or tunnel crossing, a high speed detection point on a road, an exit point at an airport parking lot, etc. The location, and, in many embodiments, the direction vehicles passing through the toll collection site (702, 704) is known and stored, e.g., at vehicle toll network accounting node 706. A plurality of vehicle identification tags (vehicle ID tag 1 706, vehicle ID tag N 708) exist in the network 120. Each vehicle ID tag (706, 708) is associated with a registered toll collection debit account holder; some of the account holders are members of locating groups. In FIG. 7, vehicle ID tag 1 706, affixed to an individual's vehicle, is shown passing detection site 1 702, and a wireless communications signal, e.g., signal 710 is sent by vehicle tag 1 706 to detection station 706, e.g., using a propriety protocol to provide identification and trigger debiting of a toll amount in the corresponding account holder's account. As part of the debiting process, information, e.g., vehicle tag ID number, toll collection site, date and time of day is collected for accounting and billing purposes and stored, e.g., in vehicle toll network accounting node 706. In accordance with one feature of the present invention, such collected stored information, as well as information associating the vehicle tag with an individual, e.g., a member of a locating group, is made available to and may be forwarded to the data collection module 122 of the location approximating infrastructure 104.

Figure 8:
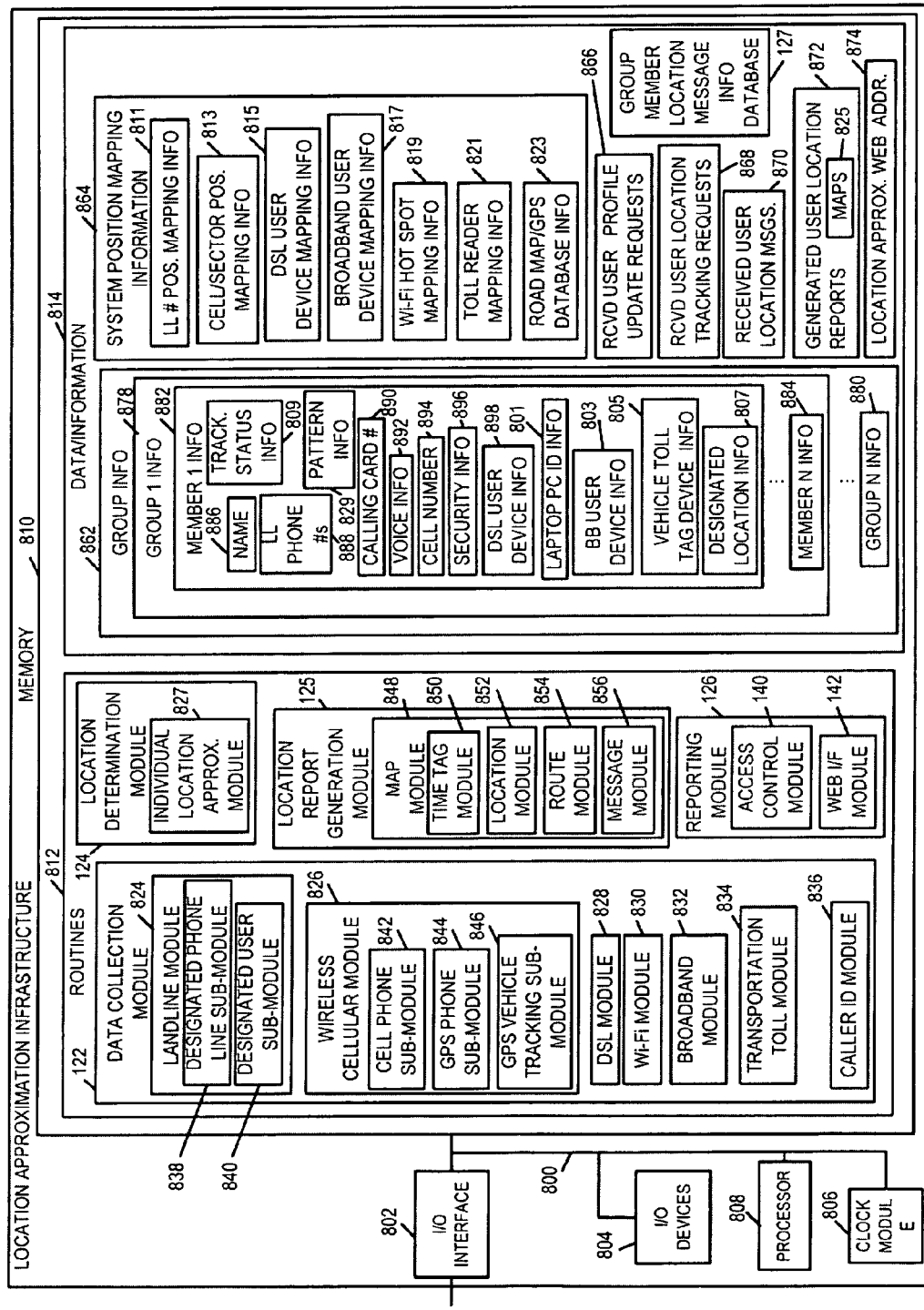
FIG. 8 is a drawing of an exemplary location approximation infrastructure, implemented in accordance with the present invention.

FIG. 8 is a drawing of an exemplary location approximation infrastructure 104, implemented in accordance with the present invention. Exemplary location approximation infrastructure 104 includes an I/O interface 802, I/O devices 804, a clock module 806, a processor 808, and memory 810 coupled together via a bus 800 over which the various elements may interchange data and information. I/O interface 802 couples location approximation infrastructure 104 to the various accounting nodes (206, 352, 354, 406, 526, 606, 706) in the communications infrastructure 102 providing connectivity to data collection module 122. In addition, I/O interface 802 provides connectivity of user interface devices (106, 108) to reporting module 126. In some embodiments, the I/O interface 802 includes a plurality of different physical connectors and/or supports a plurality of different communication protocols. In some embodiments, a common physical interface and protocol type is used in I/O interface 802, with conversions being performed, as required to achieve commonality, at other locations, e.g., at the various different accounting nodes (206, 352, 354, 406, 526, 606, 706).

Input/Output devices 804 include, e.g., keyboards, keypads, displays, printers, etc., and are used by supervisory personnel to modify, control, and monitor the location approximating infrastructure 104. Clock module 806 is used to coordinate, verify, and/or format timing information relevant to the received and processed location information including adjustments corresponding to time zone differences. The memory 810 includes routines 812 and data/information 814. The processor 808, e.g., a CPU, executes the routines 812 and uses the data/information 814 in memory 810 to control the operation of the location approximation infrastructure 104 and implement the methods of the present invention.

Routines 812 include a data collection module 122, a location determination module 124, a location report generation module 125, and a reporting module 126. The data collection module 122, operating in conjunction with the accounting nodes (206, 352, 354, 406, 526, 606, 706) collects device usage information indicating the use of one or more communication devices, GPS tracking devices, and/or transportation toll collection ID devices by individuals that are members or locating groups. Date and time tag information associated with usage information is collected by data collection module 122. In various embodiments, the method and/or division of functions between the data collection module 122 and accounting nodes, in regard to data collection may vary. For example, in some embodiments, the data collection module 122 may transfer information to the accounting nodes identifying devices and/or individuals to be tracked in the future, upon which data should be stored. In some embodiments, some of the accounting nodes transmit, e.g., periodically, information to be used for location determination, to the data collection module 122, without prompting from the data collection module 122. In some embodiments, some of the accounting nodes do not maintain listings of devices and/or users to be tracked, but rather collect and store information, e.g., device usage information, on each of the user devices within the network; requests from the data collection module 122 may access selected stored information in the accounting node. In some embodiments, the data collection module 122 sends requests of usage information on specific devices, e.g., when a user requests a location report. In some embodiments, communication device usage information transferred to the data collection module 122 includes location information, e.g., GPS location information and/or intra-cell location information. Collected information may include time tag information associated with device usage. Some information collected, used by itself, may be sufficient to associate a particular device usage with a specific individual within a locating group, while other collected information, used by itself, may be sufficient to identify a subset of individuals within a locating group while being insufficient to identify the single individual using the communications device.

Data collection module 122 includes a landline module 824, a wireless cellular module 826, a DSL module 828, a Wi-Fi module 830, a broadband module 832, a transportation toll module 836, and a caller ID module 836. Landline module 824 controls data collection corresponding to landline telephone communications network 110. Landline module 824 includes a designated phone line sub-module 838 and a designated user sub-module 840. Designated phone line sub-module 838 includes the control of data collection corresponding to the usage of landline phones designated, e.g., by phone number, to be associated with individuals or groups of individuals within a locating group. Designated phone line sub-module 838 may collect data corresponding to pre-specified home and/or office phones at known locations that may be used by individuals of locating groups. Designated user sub-module 840 operations include the control of data collection corresponding to identified individuals of locating groups who may be placing a call from a landline phone at a non-designated site, e.g., placing a call from a public phone. Designated user sub-module 840 can recognize that an individual within a locating call has placed a call by: (i) recognizing that a specific calling card number has been used or (ii) recognizing that an individual of a locating group has placed a call to access his/her voice mail service, or another remotely accessible enhanced service being maintained by the landline telephone communications network service provider. After the individual placing the call has been identified as a member of a locating group, then caller ID module 836 can be used to obtain the location of the phone, e.g., public phone, from which the call was placed.

Wireless cellular module 826 controls data collection corresponding to wireless cellular communications network 112. Wireless cellular module 826 includes a cell phone sub-module 842, a GPS phone sub-module 844, and a GPS vehicle tracking sub-module 846. Cell phone sub-module 842 includes the control of data collection corresponding to the usage of devices, e.g., cell phones, for communications, e.g., voice, video, and text. Cell phone sub-module 842 may collect data associated with cell phones belonging to individuals of locating groups, and may include information identifying the base station being used as the point of attachment, thus identifying a cell region in which the cell phone is operating. In addition, in some embodiments, triangulation techniques may be used to further locate the cell phone within a cell. GPS phone sub-module 844 includes the control of data collection corresponding to the GPS position/velocity related information obtained from enhanced cell phones including a GPS receiver or an interface to a GPS receiver. GPS vehicle tracking sub-module 846 includes the control of data collection corresponding to vehicles of members of locating groups, who have a GPS tracking device installed in their vehicle, the tracking device communicating its signaling via the wireless cellular communications network 112. GPS vehicle tracking sub-module 846 is particularly relevant in business operations, e.g., tracking deliverymen, salesmen, repairmen, etc.

DSL module 828 controls data collection which corresponds to DSL communications network 114, e.g., identifying DSL device usage corresponding to an individual of a locating group being at a known DSL site, e.g., a home computer. Wi-Fi module 830 controls data collection corresponding to Wi-Fi communications network 116, e.g., identifying an individual of a locating group being within a known Wi-Fi hot spot by identifying that the individual is using his/her laptop PC at the Wi-Fi hot spot, e.g., as identified by a log-in. Broadband module 832 controls data collection corresponding to communications network 118, e.g., identifying broadband user device usage corresponding to an individual of a locating group being at a known broadband site, e.g., an individual at home sending a signal requesting a movie on demand from the cable provider. Transportation toll module 834 controls the data collection corresponding to transportation network 120, e.g., collecting information that an individual who is a member of a locating group has passed through a known toll collection site.

Location determination module 124 uses information obtained from the data collection module 122, historical information, and/or inferential logic to determine the location of individuals within locating groups of individuals. Location determination module 124 includes an individual location approximation module 827. Individual location approximation module 827 obtains an approximate location, e.g., the best guess location for each member of a locating group, if possible. For example, the last known location approximation determination for each member of a locating group may be determined. In some cases, an individual may be placed precisely, e.g., at a dedicated landline phone site, at a toll collection point, at a GPS obtained point. Other individuals may be location determined to a region, e.g., a cell, a portion of a cell, a Wi-Fi hot spot. Other users may be placed by process of elimination. For example, each member except one in a locating group may have been positively placed via a cell phone location determination, the remaining member may be placed by the detection of usage at a common site, e.g., a common landline home phone available to each of the member of the group. At some times, some of the individuals of a locating group may not be located, e.g., due to insufficient collected data and/or due to locating authorization restrictions. Location determination module 124 can, in some embodiments, adjust individual location determination estimates based on feedback information received from a member of a locating group and/or by information extracted from location related messages left in the group member common message store.

Location report generation module 125 uses the location determinations output from location determination module 124 to generate location reports for members of locating groups to view. Location reports can be generated in text and map format. Reports of stored location messages can be generated in a text format. Location report generation module 125 includes a map module 848 used for generating map format location reports. Map module 848 includes a time-tag module 850, a location module 852, a route module 854, and a message module 856. Time-tag module 850 generates time-tags placed on the map, e.g., a map generation time-tag and a time-tag associated with each identified member's location determination which is placed on the map. Location module 852 generates a map in a format illustrating location determination estimations for at least some members of a group of members, e.g., last determined location fix for each member. Route module 854 generates a map in a format which includes time sequential tracking of location determination estimates of an individual, e.g., tracking an individual's location through the course of a day. Message module 856 includes received group member location message information as part of a generated location map.

Reporting module 126 outputs generated reports from location report generation module 125 to requesting individuals of locating groups who meet the security access requirements. Reporting module 126 includes access control module 140 and Web interface module 142. Access control module 140 limits access to the Web interface, e.g., via user log-in including, e.g., passwords. In some embodiments, different levels of access to a locating group may be provided. For example, a family locating group may be configured such that parents have unlimited access to minor children location tracking, selected access to adult children or extended family member tracking, e.g., during certain hours, while minor children may have no or limited access to adult member location tracking. In a business environment, a supervisor may be allowed access to his/her supervised workers location determinations during work hours, excluding lunch hours, while select employees may be allowed access to other selected employees' location tracking on a need to know basis, e.g., as determined by management. Web interface module 142 is used by members of locating groups to: update user profiles, change access specifications, leave location messages for the locating group members to view, request location reports in various formats including location maps, view location messages left in the group's message store, view generated location reports, and provide feedback information on the validity of location determinations.

Data/information 814 includes group information 862, system position mapping information 864, received user profile update requests 866, received user location tracking requests 868, receiver user location messages 870, generated user location reports 872, location approximation web site address 874, and group member location message information database 127. Group information 862 includes a plurality of sets of locating group member information (group 1 information set 878, group N information set 880), e.g., each locating group corresponding to a consenting group of individuals, e.g., an extended family, an office working group, etc., in which at least some individuals of the group are allowed to view location determination information on other member(s) of the locating group under agreed upon preconditions. One member may belong to multiple locating groups, e.g., a family locating group and a work locating group, with the individual having different profiles in each group. Group 1 information 878 includes a plurality of member information sets (member 1 information 882, member N information 884).

Member 1 information 882 includes name 886, landline phone numbers 888, calling card number 890, voice information 892, cell number 894, security information 896, DSL user device information 898, laptop PC ID information 801, broadband user device information 803, vehicle toll tag device information 805, designated location information 807, tracking status information 809, and pattern information 829. Name 886 may include member 1's full name, e.g., "John Doe" and a designated name that may be used in location reports, e.g., "FATHER". Landline phone numbers 888 includes the landline phone numbers corresponding to landline user communications devices that member 1 is designated to use either on a dedicated basis or on a shared basis with other members of the locating group. Calling card number 890 includes a calling card number registered to member 1, which if detected can be used to trace the call source location of the originating site. Voice information 892, e.g., a voice model, includes information that can be used in a comparison to identify that member 1 is using a landline phone, e.g., a common landline phone that may be shared by more than one member of the group. Cell number 894 includes the number of cellular communications devices registered to member 1. Security information 896 includes, e.g., passwords, personal identification numbers, biometric information, etc., associated with member 1. DSL user device information 898 includes information identifying modems and DSL user devices associated with member 1, as well as any log-on information that may be used to identify member 1. Laptop PC ID information 801 includes information which may allow a specific laptop PC associated with member 1 to be identified, e.g., in a Wi-Fi network, and/or any Wi-Fi registration information specific to member 1. Broadband user device information 803 includes information identifying modems and broadband user devices associated with member 1, as well as any log-on information that may be used to identify member 1. Vehicle toll tag identification information 805 includes a vehicle toll tag number and/or account number associated with member 1.

Designated location information 807 includes specific location information relevant to member 1 which can be used to simplify the mapping presentation, e.g., the designation of specific location sites in user friendly terminology such as "home", "office", "school", "airport", "college", etc.

Tracking status information 809 includes information identifying the current status of member 1, e.g., currently using a DSL user device at a known site, currently in a communications session using his/her cell phone, cell phone on/off. Tracking status information 809 may also include information identifying past status of member 1, e.g., no position determinations within the last 4 hrs. Tracking status information 809 may also include information indicating the authorization and accessibility to location determination information on member 1, e.g., at different times or under different conditions. For example, at certain times, e.g., off work hours, the location determination system may not be authorized to determine, track, and/or make available the location of member 1.

Pattern information 829 includes information which may be used to identify communications device usage patterns associated with member 1. Differences between usage patterns between the members of a locating group may be used by the location determination module 124 in deciding which member of the locating group is the most likely member using a particular communications device at a give time, the communications device being a shared communications device available to a plurality of members within the locating group. Pattern information 829 may include information received and/or derived from account member applications and surveys, information from data collection module 122, information based on demographics, information based upon statistical analyses, and/or feedback information, e.g., information collected from Internet site cookies. For example, with landline phones, it may be observed that different individuals within the locating group tend to place calls lasting for different lengths of time. For example, one individual in the locating group may typically place calls lasting much longer than calls typically placed by the other members, e.g., calls exceeding 1 hr vs. 15 minute calls. As another example, consider a DSL, broadband, or fiber to the premises network including Internet service over which a plurality of services are available, e.g., download of music, download of video, interactive gaming, news, shopping. Different members of the locating group may have different preferences. For example, the father may typically access news and sports Internet sites and select pay-per-view sporting events; the mother may access news and comparative shopping Internet sites; the son may tend to access interactive gaming and music downloading. Patterns of movie and/or broadcast station selection may also vary within the locating group, e.g., one member preferring action movies another member preferring science fiction and horror movies. Other patterns may be observed between the locating group members by the interaction characteristics with a user interface. For example, consider a pull-down menu provided for user selection, one locating group member, e.g., a young individual who is very comfortable using the technology, may quickly traverse the menu entering his/her selection, while another member, e.g., an elderly grandparent less comfortable with the technology, may very slowly and meticulously go through each option of the menu.

System position mapping information 864 includes landline number mapping information 811, cell/sector position mapping information 813, DSL user device mapping information 815, broadband user device mapping information 817, Wi-Fi hot spot mapping information 819, toll reader mapping information 821, and road map/GPS database information 823. Landline mapping information 811 includes location information, e.g., latitude/longitude coordinates and/or grid coordinates associated with the end user termination points associated with landlines. Cell/sector position mapping information 813 includes information associating each base station with a cellular coverage region, e.g., latitude/longitude coordinates and/or grid coordinates including an identification of the corresponding cell tower location. DSL user device mapping information 815 includes information associating each designated DSL modem and/or DSL user device which may be used by a locating group member with a location, e.g., latitude/longitude coordinates and/or grid coordinates. Broadband user device mapping information 817 includes information associating each designated broadband modem and/or broadband user device which may be used by a locating group member with a location, e.g., latitude/longitude coordinates and/or grid coordinates. Wi-Fi hot spot mapping information 819 includes information associating each Wi-Fi base station with a coverage region, e.g., latitude/longitude coordinates and/or grid coordinates. Toll reader mapping information 821 includes information associating toll collection sites with position coordinates, e.g., latitude/longitude and/or grid coordinates. Road map/GPS database information 823 includes road mapping atlas databases including designated points of interest. In some embodiments, the location approximation infrastructure 104 works in conjunction with a commercially available mapping database to be used in generating the underlying map presentation upon which locating group member approximate location fixes are superimposed.

Received user profile update requests 866 include locating group member request to change member profile information, e.g., member 1 information 882. For, example, an individual may purchase a new cell phone and desire that the new cell phone number be included in his/her user profile for the purposes of location determination within a specified locating group. Received user location tracking requests 868 include requests from a locating group member to view a location report, e.g., in one of the available presentation formats. Received user location messages 870 include messages that a member of a locating group may send to a group message store to be available for at least some other member of the same locating group to view. Messages 870 may be especially useful to supplement the locating capabilities provided by collecting data on monitored communication infrastructure and devices. For example, a member of a locating group may be at a school, friend's house, library, business site, hotel, etc., where Internet access is available, but the position of the user terminal is not available to or known by the communications service provider implementing the group locating service. In such a situation, sending a location message to the common locating group message store allows a more complete view of the locating group to be available.

Generated user location reports 872 are the result of location report generation module 125 and may be viewed by authorized members of a locating group, e.g., via the Web interface 142. Generated user location reports 872 include maps 825, e.g., location reports in map format identifying each member of the locating group and including a time-tag associated with each member's location estimation fix.

Location approximation Web address 874 is the address for the Web portal interface 142 through which locating group member may request and view location reports. Group member location message information database 127 includes a plurality of subsets, each subset corresponding to a common data store for a locating group which may be used to store messages for the group.

Figure 9:
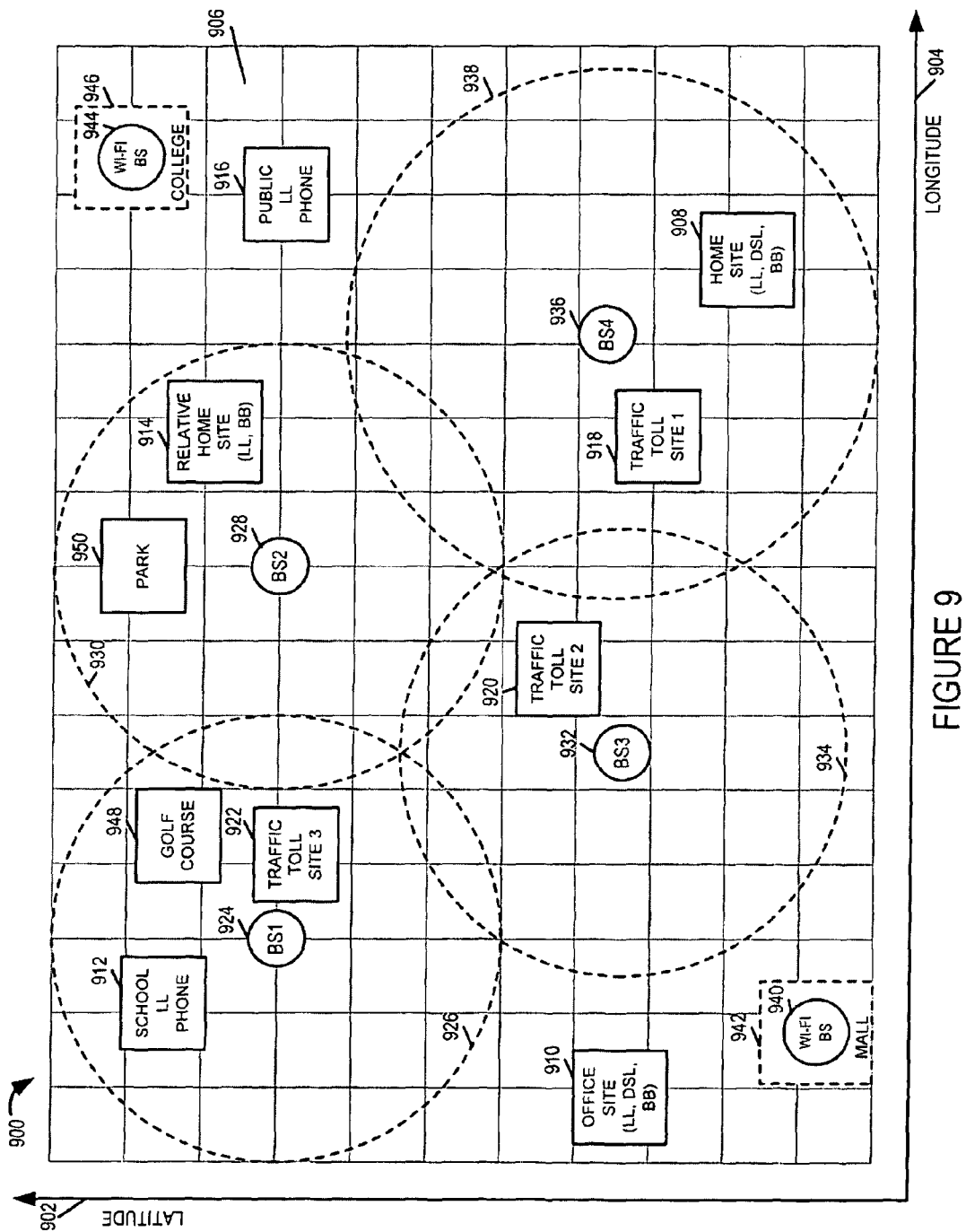
FIG. 9 is a drawing of an exemplary map used to illustrate location determination of individuals within a locating group and exemplary location report display in accordance with the present invention.

FIG. 9 is a drawing 900 of an exemplary map used to illustrate location determination of individuals within a locating group and exemplary location report display in accordance with the present invention. Vertical axis 902 represents latitude while horizontal axis 904 represents longitude. An exemplary grid is also included as shown by 165 grid boxes 906; the grid lines may be structured to represent lines of latitude/longitude or a different grid representation, e.g., a grid representation based on fixed distances, a standard grid representation such as Universal Transverse Mercator (UTM) coordinate system, a GPS representation such as World Geodetic 1984 (WGS-84), or a custom grid representation, e.g., a grid covering the locating groups expected locating range region. Home site 908 includes landline user devices, DSL user devices, and broadband user devices. Office site 910 includes landline user devices, DSL user devices, and broadband user devices. Relative home site 914, e.g., a grandparents home, includes a landline phone and a baseband user device, e.g., interactive cable television. User communication devices at home site 908, relative home site 914, and office site 910 may be designated as communication devices associated with one or more members of the locating group, and detected activity of those devices can be used to perform location determinations. School landline phone 912 and public landline phone 916, can be used to identify and locate a member of a locating group when the member initiates a call from one of those devices using a calling card number stored in the member's user profile of the locating system or when the member places a call to his/her answering service, e.g., maintained by the same service provider operating the location determination system. Traffic toll sites (site 1 918, site 2 920, site 3 922) each represent known locations of toll collection points in an automated toll collection system, and may be used to place a vehicle tag associated with a locating group member. A plurality of base stations (BS 1 924, BS 2 928, BS 3 932, BS 4 936) each with a corresponding coverage area (926, 930, 934, 938), respectively are shown. Members of a locating group having cell phones may be approximately located within a cellular coverage area based on network attachment point, and in some embodiments, more precisely located, e.g., based upon triangulation techniques. Two Wi-Fi base stations (940, 944) with coverage area (942, 946) are shown at a (mall, college), respectively. Individuals of locating groups may use a laptop PC with a Wi-Fi interface and be located by being associated with the laptop PC and/or network log-in information, e.g., username, password, etc. In addition, two user designated sites, a golf-course 948 and a park 950 are shown which may be locations typically frequented by a locating group member which may correspond to frequent cell phone operation points. As discussed above, the map presentation format is one exemplary way of providing location information. Location reports can be provided in other formats as well, e.g., in table formats or in audio formats.

Figure 10:
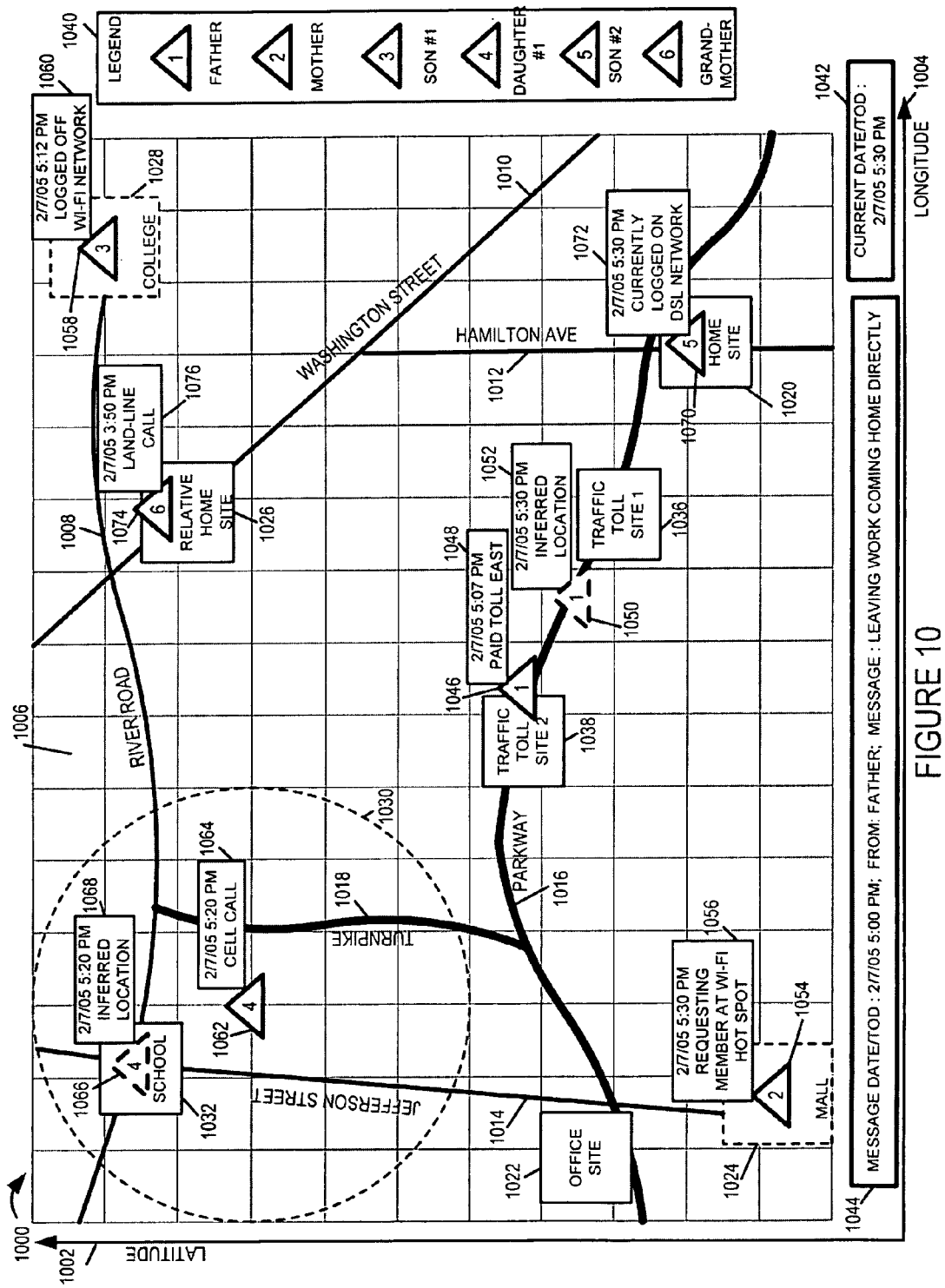
FIG. 10 is a drawing of an exemplary location determination report for an exemplary locating group in map format, in accordance with the present invention.

FIG. 10 is a drawing of an exemplary location determination report 1000 for an exemplary locating group in map format, in accordance with the present invention. Exemplary report 1000 includes time-tags associated with individual location determination estimations and message(s) from the locating group common message store. The map includes a vertical axis 1002 representing latitude and a horizontal axis 1004 representing longitude, as well as a grid including 165 grid boxes 1006. A plurality of roads are shown (River Road 1008, Washington Street 1010, Hamilton Ave 1012, Jefferson Street 1014, Parkway 1016, Turnpike 1018). The map also includes a home site 1020, an office site 1022, a mall site 1024, a relative home site 1026, a college site 1028, a cell coverage area 1030, a school site 1032, a traffic toll site 1 1036, and a traffic toll site 2 1038. Legend 1040 indicates the designation for each member of the locating group. The location of each group member is indicated on the map by a triangle with a number, where the number (1, 2, 3, 4, 5, 6) represents (father, mother, son #1, daughter #1, son #2, grandmother), respectively. Some members are represented by more than one location determination. Box 1042 indicates the current date and time of day corresponding to the location report, indicating Feb. 7, 2005 5:30 PM. Box 1044 includes an exemplary message from the common message store for the locating group, "Leaving work—coming directly home", a date/time tag identifying when the message was left, Feb. 7, 2005 5:00 PM, and a member identifier, "Father", identifying the member who left the message. Triangle 1046 locates the father at traffic toll site 2 1038. Indicator box 1048 specifies that the toll was paid eastbound on Feb. 7, 2005 at 5:07 PM. Triangle 1050 approximates the location of the father at 5:30 PM. Indicator box 1052 specifies that the position fix is an inferred location and includes the corresponding date and time-of-day (TOD). Triangle 1054 locates the mother to be at a Wi-Fi Hot Spot within a mall. Indicator box 1056 indicates the date and TOD to be Feb. 7, 2005 5:30 PM and indicates that the mother is the member requesting the location report. Triangle 3 1058 and indicator box 1060 indicates that son #1 was last located at the college WiFi network hot spot when he logged off at Feb. 7, 2005 5:12 PM. Triangle 1062 and indicator box 1064 indicates that daughter #1 participated in a cell call at 5:20 PM on Feb. 7, 2005 and thus was situated at that time somewhere in cell 1030. Triangle 1066 and indicator box 1068 indicates that the inferred location of daughter #1 at Feb. 7, 2005 on 5:20 PM is school 1032. This inferred location can be based upon historical tracking information, user designated location information, and/or means of more precisely locating the cell phone within the cell, e.g., triangulation techniques using multiple base stations. Triangle 1070 and indicator box 1072 indicates that at 5:30 PM on Feb. 7, 2005 son #2 is at home currently logged on the DSL network. Triangle 1074 and indicator box 1076 indicate that the grandmother placed an out-going call from her landline phone at 3:50 PM on Feb. 7, 2005.

The mother, who requested the location report, can plan her trip home accordingly. For example, she may stop at the school to pick-up daughter #1 and then check in on the grandmother. Daughter #1 may typically have her phone turned-off for most of the time while at school after hours, e.g., as she is participating in sporting activities; however, the mother can determine from the location report, without the need to establish a communications connection with any of the locating group members that she needs to pick-up daughter #1.

Figure 11:
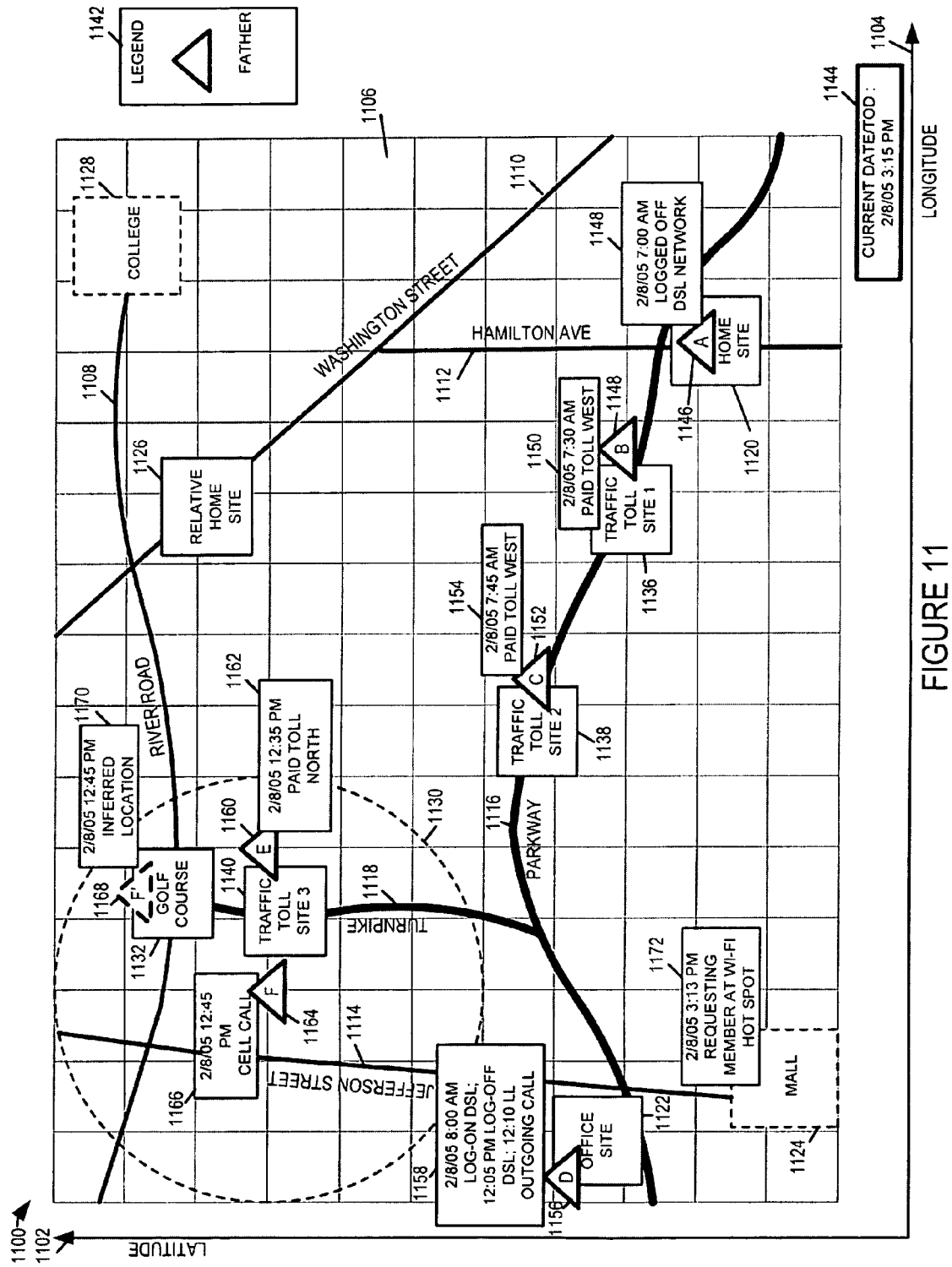
FIG. 11 is a drawing of another exemplary location determination report for an exemplary locating group member in map format, in accordance with the present invention.

FIG. 11 is a drawing of another exemplary location determination report 1100 for an exemplary locating group member in map format, in accordance with the present invention. The exemplary location report 1100 provides tracking of an individual member of the locating group over a period of time including multiple individual location determinations for the same individual over time. In some embodiments of the present invention, multiple members of the same locating group, e.g. selected members and/or each of the members of the locating group, may be shown with similar tracking on the same map.

Exemplary report 1100 includes time-tags associated with individual location determination estimations. The map includes a vertical axis 1102 representing latitude and a horizontal axis 1104 representing longitude, as well as a grid including 165 grid boxes 1106. A plurality of roads are shown (River Road 1108, Washington Street 1010, Hamilton Ave 1112, Jefferson Street 1114, Parkway 1116, Turnpike 1118). The map also includes a home site 1120, an office site 1122, a mall site 1124, a relative home site 1126, a college site 1128, a cell coverage area 1130, a golf course site 1132, a traffic toll site 1 1136, a traffic toll site 2 1138, and a traffic toll site 3 1140. Legend 1142 indicates the father is the member of the locating group being tracked and is indicated by a triangle on the map. Box 1044 indicates the current data and time of day corresponding to the location report, indicating Feb. 8, 2005 3:15 PM. Triangle A 1146 and indicator box 1148 indicate that the father was at home on Feb. 8, 2005 and logged off the DSL network at 7:00 AM. Triangle B 1148 and indicator box 1150 indicate that the father passed through traffic toll site 1 1136 traveling west on Feb. 8, 2005 at 7:30 AM. Triangle C 1152 and indicator box 1154 indicate that the father passed through traffic toll site 2 1138 on Feb. 8, 2005 at 7:45 AM traveling westbound. Triangle D 1156 and indicator box 1158 indicate that the father logged on the DSL network at his office on Feb. 8, 2005 at 8:00 AM, logged off at 12:05 PM, and placed an outgoing call on his land-line phone at 12:10 PM. In some embodiments, the called party location can also be determined, e.g., via caller ID and used in further location determination estimation. For example, the call may have been placed to the country club to confirm a golfing reservation. Triangle E 1160 and indicator box 1162 indicate that the father passed through traffic toll site 3 1140 on Feb. 8, 2005 at 12:35 PM heading northbound. Triangle F 1164 and indicator box 1166 indicate that the father participated in a cell call on Feb. 8, 2005 at 12:45 PM and was within the region of cell 1130. Triangle F' 1168 and indicator box 1170 indicate that the location determination system infers that the father is at the golf course 1132 on Feb. 8, 2005 on 12:45, e.g., based upon more detailed locating techniques such as cell signal triangulation, and/or other collected location information. Indicator box 1172 indicates that the member requesting the location report is at a WI-Fi hot spot and the requesting date/TOD is Feb. 8, 2005 3:13 PM.

Figures 12, 12A, 12B:
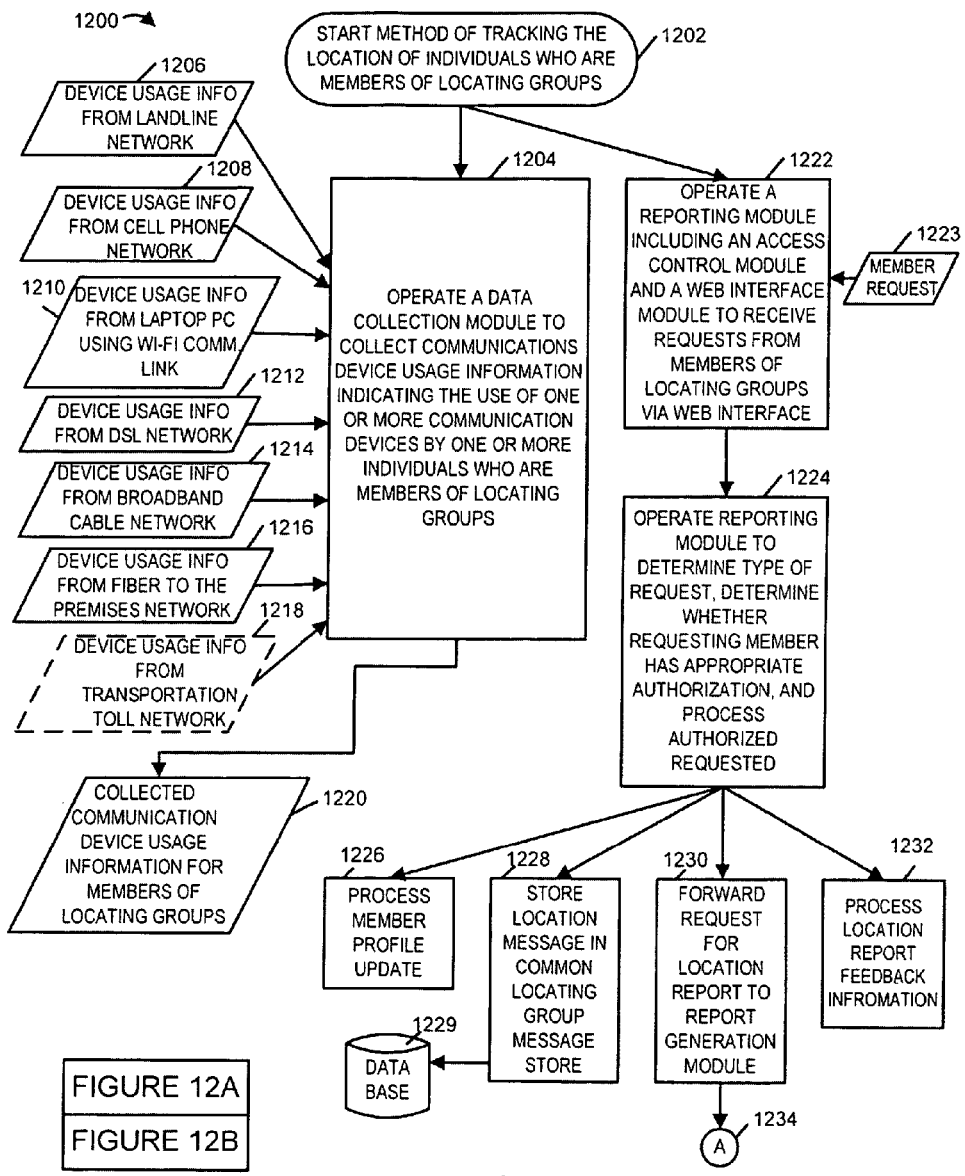
FIG. 12 comprising the combination of FIG. 12A
FIG. 12B is a flowchart of an exemplary method of tracking the location of individuals who are members of locating groups of individuals, in accordance with the present invention.
Figure 12B:
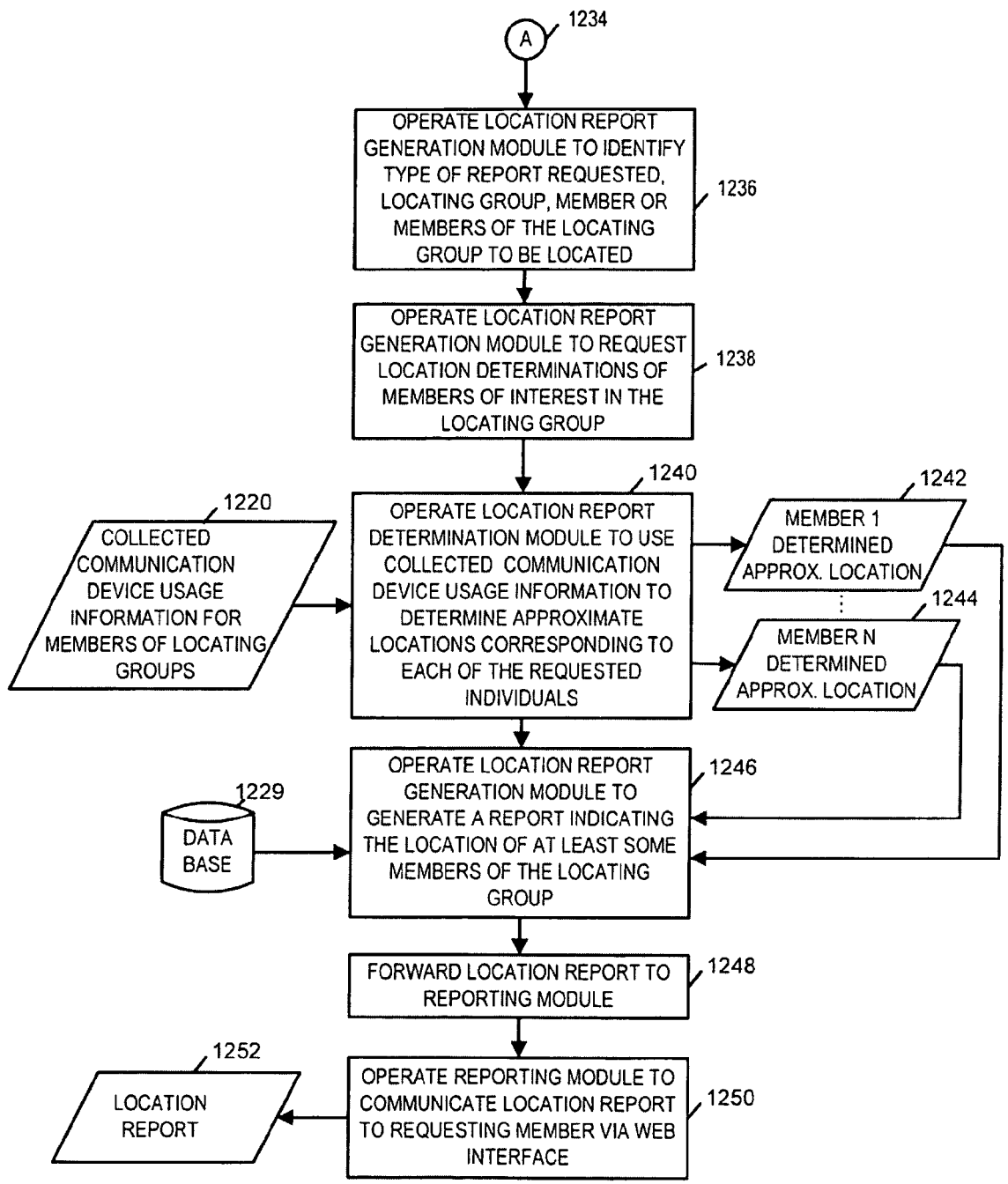

FIG. 12 comprising the combination of FIG. 12A and FIG. 12B is a flowchart 1200 of an exemplary method of tracking the location of individuals who are members of groups of individuals, in accordance with the present invention. The exemplary method of tracking the location of individuals who are members of locating groups starts in step 1202, where the locating system is powered on and initialized. For example, a location approximation infrastructure coupled to a plurality of different communication and/or transportation networks is configured with information associating individuals with locating groups; each individual member of a locating group may be associated with a user profile identifying the user with specific user communications: networks, devices, lines, links, numbers, personal identification information, designation location information, pattern information, and/or toll collection devices. Location information associated with the various communications devices, toll collection sites, and points of the communications infrastructure are also stored in the locating system. Operation proceeds from start step 1202 to step 1204 and step 1222.

In step 1204, a data collection module is operated to collect communications device usage information indicating the use of one or more communications devices by one or more individuals who are members of locating groups. In step 1204, data collection can be from a plurality of different networks, e.g., a landline telephone network, a wireless cellular communications network, a DSL communications network, a Wi-Fi communications network, other high capacity networks such as broadband cable networks and/or fiber to the premises networks, and, in some embodiments, transportations networks, e.g. an EZ-Pass network. The different communications networks may use different communications protocols. In step 1204, the data collection module collects: (i) device, e.g., landline phone, usage from a landline network 1206, (ii) device, e.g., cell phone, GPS cell phone and/or GPS cellular communication device, usage information from a cell phone network 1208, (iii) device, e.g., laptop PC, usage information using a Wi-Fi communications network 1210, (iv) device, e.g., hardwired PC, usage information from a DSL network 1212, (v) device, e.g., interactive broadband cable video on demand interface box, usage information from a broadband cable network 1214, (vi) device usage information from a fiber to the premises network 1216, (vii) device, e.g., EZ-Pass toll tag device, usage information from a transportation toll network 1218. The data collection may be performed on an ongoing basis. Usage information transfer from the various communications networks to the data collection module may be performed differently to accommodate the accounting and recording structure of each network. For example, some communications networks may maintain lists of individuals and/or devices to be tracked and communicate, e.g., periodically, collected information to the data collection module. Other communications networks may respond to specific requests on individuals and/or communications devices, access a general communications accounting database being maintained, e.g., for its own internal accounting and/or billing purposes, retrieve the requested information and forward the requested information to the data collection module. In addition, some of the communication networks may be operated by the same service provider operating the data collection module of the locating system, while some of the communications networks may be operated by other service providers working in cooperation to provide the locating service. Those communications networks operated by the same service provider as the service provider operating the data collection module which have been customized for efficiency, would typically be able to provide more precise and/or more timely user device usage information relevant to location determination, than other communications networks operated by partner service providers. The result output of step 1204 is collected communications device usage information for members of locating groups 1220. Information 1220 can be refreshed as new information becomes available, with some information considered as no longer useful from a location report perspective being discarded.

In step 1222, a reporting module in the locating system is operated to receive requests 1223 from members of locating groups. The reporting module includes a web interface to interface with locating group user members, the user member accessing the Web interface via the Internet and the user member having a user interface device, e.g., a PC, laptop PC, PDA, cell phone with Internet access, including a display for displaying location reports including maps. In some other embodiments, the reporting module may include, in place of or in addition to the Web interface, other interfaces, e.g., a phone line interface such as a voice/DTMF interface with automated menus. The reporting module also includes an access control module for restricting access, e.g., of location reports, to members of a locating group who are authorized to view the reports. Different levels of access may be provided, e.g., some members may be allowed to modify user profiles while others may be restricted; some members may be allowed to look at location reports including location determination of each of the members of the locating group; some members may be restricted to viewing location reports of designated sub-sets of members of the locating group, while other members may be restricted from viewing any location reports. Operation proceeds from step 1222 to step 1224. In step 1224 the reporting module is operated to determine the type of request, determine whether the requesting member has appropriate authorization, and process authorized requests. Operation proceeds from step 1224 to step 1226, 1228, 1230, or step 1232 depending on the type of authorized request. If the request was to update member profile information, operation proceeds from step 1224 to step 1226, where the reporting module performs the member profile update, e.g., adding a new cell phone number to the member's user profile. If the request was to store a location message in the common locating group message store, operation proceeds from step 1224 to step 1228, where the reporting module stores the location message, e.g., "Leaving work now coming home directly" in the common message store with a group member identifier, e.g., "FATHER" and a date/time tag. The group message store is part of database 1229. In some embodiments, messages can be stored and/or viewed in the common locating group message store via an instant messaging feature included in communication systems, e.g., a wireless communications system and/or an Internet based system supporting instant messaging. If the request was for a location report, then operation proceeds from step 1224 to step 1230 where the reporting module is operated to forward the request for the location report to a report generation module. If the request was to provide feedback information on a received location report, operation proceeds from step 1224 to step 1232, where the reporting module is operated to receive and process the feedback information, e.g., modifying and/or refining the estimated location determinations based on the feedback information.

From step 1230, operation proceeds to step 1236 via connecting node A 1234. In step 1236, the location report generation module is operated to identify the type of report request, locating group, and/or member or members of the locating group to be located. In some embodiments, different types of reports and/or options are available, e.g., location maps, tracking maps, text reports, specified member inclusion in the report, range of area coverage, display format, time range coverage, etc. Operation proceeds from step 1236 to step 1238. In step 1238 the location report generation module is operated to request location determinations of members of interest in the locating group of interest. Operation proceeds from step 1238 to step 1240.

In step 1240 the location report determination module is operated to use collected communication device usage information 1220 to determine approximate locations corresponding to each of the requested individuals. In some embodiments, the location determination module signals the data collection module initiating some additional data collection in response to the received request, e.g., a request identifying specific communication devices and/or individual user profile information. Usage information of a communication device or communications infrastructure associated with an individual of interest or being used by an individual of interest is coordinated with known stored location information, e.g., the location coordinates of a particular landline phone, DSL device, base station antenna tower, etc. The location determination module can also use inferential logic to determine an individual's approximate location, e.g., identifying an individual using a common communications device shared by members of a group based on processes of elimination, historical observed patterns, etc. Determined approximate locations (member 1 determined approximate location 1242, member N determined approximate location 1244) are output from step 1240 and received and used in step 1246. In some embodiments, multiple location determinations corresponding to the same member, e.g., associated with different locating time-tags and/or associated with different levels of position uncertainty are output to be used in the same location report.

Operation proceeds from step 1240 to step 1246. In step 1246, the location report generation module is operated to generate a report indicating the location of at least some members of the locating group. For example, the report may be in the form of a map including a different symbol designating each member of the locating group, the placement of each symbol on the map identifying the location determination system's estimate of the individual's position, e.g., based on the last communication device usage information associated with the individual. In some embodiments, a time tag may be included with the symbol on the map, e.g., a time-tag identifying the point in time of the communication device usage associated with the location determination for the individual. In some embodiments, some information included in the generated report includes global position information and/or vehicle toll payment information. In some embodiments, the generated report may include information from at least one group member location information message stored in a group member location information common store in database 1229. Operation proceeds from step 1246 to step 1248.

In step 1248, the location report generation module forwards the generated location report to the reporting module. Operation proceeds from step 1248 to step 1250.

In step 1250, the reporting module is operated to communicate the generated location report 1252 to the requesting member via the Web interface. The requesting member may display and view on the report on the display included in the user interface device. Various interactions are possible between the requesting user's interface and the reporting module to modify the displayed report and/or request a different report or different report format, e.g., changing the scale of the map to zoom in or zoom out, requesting additional tracking on a specific member, etc.

In various embodiments elements described herein are implemented using one or more modules to perform the steps corresponding to one or more methods according to the present invention. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the embodiments according to the present invention may be implemented in a machine-readable medium including machine executable instructions for causing a machine, e.g., processor and associated hardware which may be part of a device, to perform one or more of the steps of the above-described method(s).

Numerous additional variations on the methods and apparatus according to the present invention described above will be apparent to those skilled in the art in view of the above description. Such variations are to be considered within the scope of the invention, as defined by the claims that follow.

What is claimed is:

1. A method comprising:
   collecting, in a data collection module of a network infrastructure, communications device usage information indicating the use of a landline communications device by a first individual, the first individual being a member of a group of individuals, the collected information comprising caller-ID information from the landline communications device;
   determining an identity of the first individual by collecting voice recognition information from the landline communications device;
   determining, by a location determination module in the network infrastructure and coupled to the data collection module, a location of the landline communications device from the caller-ID information, the location of the landline communications device being a determined location of said first individual;
   generating, by a location generation module coupled to the determination module, a location report indicating the determined location of the first individual at at least one point in time; and providing said location report to at least one member of said group of individuals.

2. The method of claim 1, wherein the caller-ID information is received at the determination module from a landline communications network accounting node coupled to a landline telephone communications network.

3. A method comprising:
    storing, in a data collection module of a network infrastructure of a network, voice recognition data and communications device usage information indicating the use of a communications device by a first individual, the first individual being a member of a group of individuals;
    determining, by a location determination module in the network infrastructure and coupled to the data collection module, a location of the first individual from the collected information, the location determination module using inferential logic such that the location is determined without being provided with a current location of the communications device, use of the inferential logic including adjusting individual location determination estimates based on at least one of: feedback information received from a member of the group of individuals or information extracted from location-related messages left in a group member common message store;
    generating, by a location report generation module coupled to the location determination module, a location report indicating the determined location of the first individual at at least one point in time; and
    providing said location report through the network to at least one member of said group of individuals.

4. The method of claim 3, wherein determining a location of the first individual from the collected information comprises:
    determining that the communications device is turned off,
    retrieving a set of possible locations of the first individual from a list of locations where the communications device is known to have previously been turned off, and
    selecting one of the possible locations as the determined location.

5. A method comprising:
    storing, in a data collection module of a network infrastructure of a network, voice recognition data and communications device usage information indicating the use of a communications device by an unidentified one of a group of individuals having access to the communications device;
    determining, using inferential logic, that a first individual is the user of the communications device, identification of the first individual as the user of the communications device determined without being directly identified in the stored information, the first individual being a member of the group of individuals, said determining using inferential logic including:
        determining, at a particular location, communications device usage of a communications device associated with one of the group of individuals,
        retrieving communications device usage patterns unique to communications devices associated with the group of individuals, and
        matching the communications device usage at the particular location to communications device usage unique to the first individual using the retrieved communications device usage patterns; and
    wherein the method further includes:
    determining, by a location determination module in the network infrastructure and coupled to the data collection module, a location of the communications device from the stored usage information;
    generating, by a location report generation module coupled to the location determination module, a location report indicating the determined location of the first individual at at least one point in time; and
    providing said location report through the network to at least one member of said group of individuals.

6. The method of claim 5, wherein determining a location of the communications device from the stored usage information comprises determining that the first individual is located at a particular location by at least:
    detecting usage of a communications device at the particular location, and
    excluding all other individuals of the group of individuals who have access to the particular location by determining that none of the other individuals are at the particular location.

7. The method of claim 6 wherein the particular location is a residence of the first individual.

8. The method of claim 5 wherein a communications device usage pattern unique to the first individual comprises an identity of a destination of a computer generated message originating from the particular location.

9. The method of claim 5 wherein a communications device usage pattern unique to the first individual comprises a duration of a communication using the communications device.

10. The method of claim 5 wherein a communications device usage pattern unique to the first individual comprises selection of television programming.

11. The method of claim 5 wherein a communications device usage pattern unique to the first individual comprises rapidity of selections on a menu of the communications device.

* * * * *